(12) United States Patent
Toda

(10) Patent No.: US 8,306,414 B2
(45) Date of Patent: Nov. 6, 2012

(54) POSITIONING DEVICE, POSITIONING METHOD AND STORAGE MEDIUM

(75) Inventor: Naoto Toda, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 48 days.

(21) Appl. No.: 12/963,833

(22) Filed: Dec. 9, 2010

(65) Prior Publication Data

US 2011/0150452 A1 Jun. 23, 2011

(30) Foreign Application Priority Data

Dec. 22, 2009 (JP) ................. 2009-290372

(51) Int. Cl.
*G03B 17/24* (2006.01)
*G01C 21/00* (2006.01)
(52) U.S. Cl. .................... 396/310; 701/408
(58) Field of Classification Search .............. 396/310; 701/207, 408
See application file for complete search history.

(56) References Cited

U.S. PATENT DOCUMENTS

| 7,333,054 B2 | 2/2008 | Ueno et al. |
| 2003/0236619 A1 | 12/2003 | Dorian et al. |
| 2007/0263981 A1 * | 11/2007 | Ueno et al. ............ 386/83 |

FOREIGN PATENT DOCUMENTS

| JP | 2006-166421 A | 6/2006 |
| JP | 2007-155577 A | 6/2007 |
| JP | 2008-197064 A | 8/2008 |

OTHER PUBLICATIONS

Japanese Office Action dated Sep. 20, 2011 (and English translation thereof) in counterpart Japanese Application No. 2009-290372.
Korean Office Action dated Mar. 6, 2012 (and English translation thereof) in counterpart Korean Application No. 10-2010-0131533.

* cited by examiner

*Primary Examiner* — Rochelle-Ann J Blackman
(74) *Attorney, Agent, or Firm* — Holtz, Holtz, Goodman & Chick, PC

(57) ABSTRACT

A positioning device including: a positioning unit that performs positioning of position information at each time when predetermined positioning conditions are met; a storage unit that stores position information of at least one specified position, in association with a category from among a plurality of types of categories; a position setting unit that sets a specified position from among specified positions stored in the storage unit; a region setting unit that sets a region of a size corresponding to a category to which the specified position set by the position setting unit belongs, in association with the specified position; a region determining unit that determines whether or not position information obtained by the positioning unit belongs to the region set by the region setting unit; and a positioning control unit that changes the positioning conditions of the positioning unit based on determination results determined by the region determining unit.

25 Claims, 14 Drawing Sheets

FIG. 3

MOUNTAIN, BEACH, AND LAKE DATA TABLE

VALID TIME  06:00~20:00

REGIONAL RANGE  RADIAL DISTANCE 2km

| NAME | LONGITUDE AND LATITUDE |
|---|---|
| MT. FUJI | X:138.731,Y:35.363 |
| MT. ASO | X:131.085,Y:32.889 |
| ⋮ | ⋮ |
| MATSUSHIMA | X:141.074,Y:38.366 |
| KATSURAHAMA | X:133.574,Y:33.495 |
| ⋮ | ⋮ |
| LAKE TOYA | X:140.852,Y:42.579 |
| LAKE BIWA | X:136.096,Y35.262 |
| ⋮ | ⋮ |

FIG. 4

BRIDGE AND DAM DATA TABLE

VALID TIME  06:00~20:00

REGIONAL RANGE  RADIAL DISTANCE 1km

| NAME | LONGITUDE AND LATITUDE |
|---|---|
| RAINBOW BRIDGE | X:139.769,Y:35.635 |
| NARUTO OOHASHI | X:134.655,Y:34.240 |
| ⋮ | ⋮ |
| OKUTADAMI DAM | X:139.250,Y:37.153 |
| KUROBE DAM | X:137.662,Y:36.566 |
| ⋮ | ⋮ |

FIG. 5

PARK, GARDEN, AND CASTLE DATA TABLE

VALID TIME  09:00~18:00

REGIONAL RANGE  RADIAL DISTANCE 500m

| NAME | LONGITUDE AND LATITUDE |
|---|---|
| OZE NATIONAL PARK | X:139.205,Y:36.920 |
| UENOONSHI PARK | X:139.774,Y:35.715 |
| ⋮ | ⋮ |
| KAIRAKUEN | X:140.453,Y:36.375 |
| KORAKUEN | X:133.936,Y:34.668 |
| ⋮ | ⋮ |
| EDO CASTLE RUINS | X:139.757,Y:35.686 |
| HIMEJI CASTLE | X:134.694,Y:34.839 |
| ⋮ | ⋮ |

FIG. 6

SHRINE, TEMPLE, AND BUILDING DATA TABLE

VALID TIME  09:00~18:00

REGIONAL RANGE  RADIAL DISTANCE 200m

| NAME | LONGITUDE AND LATITUDE |
|---|---|
| ISE TEMPLE | X:136.726,Y:34.455 |
| IZUMO TEMPLE | X:132.685,Y:35.402 |
| ⋮ | ⋮ |
| TOYKO TOWER | X:139.745,Y:35.658 |
| TSUTENKAKU | X:135.506,Y:34.652 |
| ⋮ | ⋮ |

POSITIONING DEVICE, POSITIONING METHOD AND STORAGE MEDIUM

CROSS-REFERENCE TO RELATED APPLICATIONS

This application is based on and claims the benefit of priority from Japanese Patent Application No. 2009-290372 filed on Dec. 22, 2009, the content of which is incorporated herein by reference.

BACKGROUND OF THE INVENTION

1. Field of the Invention

The present invention relates to a positioning device, a positioning method and a storage medium.

2. Related Art

Conventionally, there are provided positioning devices that perform positioning of a current position in a predetermined time interval using a positioning unit capable of measurement of an absolute position such as GPS (Global Positioning System). In addition, positioning of an absolute position by way of such a positioning unit, in general, requires high electrical power consumption, and thus the positioning interval of the absolute position is set to be large to some extent in order to suppress electrical power consumption.

For example, Japanese Unexamined Patent Application Publication No. 2008-197064 proposes a device designed to achieve an improvement in positional accuracy only in the vicinity of an intersection by shortening the positioning time interval, in order to prevent a delay in reroute setting that arises due to the length of the positioning interval.

However, although the size of the area which requires high accuracy of positioning would change in accordance with a purpose of use, the positioning device described in the above-mentioned Japanese Unexamined Patent Application Publication No. 2008-197064 is devised to attain only one purpose of use, i.e., improving accuracy of positioning only in the vicinity of an intersection, and thus cannot change accuracy of positioning in accordance with a purpose of use, and accordingly is lacking in convenience.

It is therefore an object of the present invention to provide a positioning device, positioning method and storage medium having stored therein such a program capable of improving the positional accuracy in accordance with changes in purpose of use, while suppressing the consumption of electrical power, and to improve the convenience to the user.

SUMMARY OF THE INVENTION

In order to attain the above mentioned purpose, in accordance with a first aspect of the present invention, there is provided a positioning device including: a positioning unit that performs positioning of position information at each time when predetermined positioning conditions are met; a storage unit that stores position information of at least one specified position, in association with a category from among a plurality of types of categories; a position setting unit that sets a specified position from among specified positions stored in the storage unit; a region setting unit that sets a region of a size corresponding to a category to which the specified position set by the position setting unit belongs, in association with the specified position; a region determining unit that determines whether or not position information obtained by the positioning unit belongs to the region set by the region setting unit; and a positioning control unit that changes the positioning conditions of the positioning unit based on determination results determined by the region determining unit.

In order to attain the above mentioned purpose, in accordance with a second aspect of the present invention, there is provided a positioning device including: an imaging unit that photographs a subject and acquiring photographed image information; a positioning unit that performs positioning of position information at each time when predetermined positioning conditions are met; a storage unit that stores position information of at least one specified position in association with a category from among a plurality of types of categories; a category determining unit that determines, from among the plurality of types of categories, which category the position information positioned by the positioning unit in a time period related to a time when the imaging unit performs photographing belongs to; a region setting unit that selects a category based on determination results determined by the category determining unit, extracts position information of the specified position belonging to the category thus selected from the storage unit, and sets a region of a size corresponding to the category to which the specified position thus extracted belongs, in association with the specified position; a region determining unit that determines whether or not the position information obtained by the positioning unit belongs to the region set by the region setting unit; and a positioning control unit that changes the positioning conditions of the positioning unit based on determination results determined by the region determining unit.

In order to attain the above mentioned purpose, in accordance with a third aspect of the present invention, there is provided a positioning device including: an imaging unit that photographs a subject and acquiring photographed image information; a positioning unit that performs positioning of position information at each time when predetermined positioning conditions are met; a storage unit that stores position information of at least one specified position, in association with a category of a plurality of types of categories; a category determining unit that determines, from among the plurality of types of categories, which category the position information positioned by the positioning unit in a time period related to a time when the imaging unit performs photographing belongs to; a region setting unit that sets a region of a size corresponding to a category to which the specified position stored in the storage unit belongs, in association with the specified position; a region determining unit that determines whether or not position information obtained by the positioning unit belongs to the region set by the region setting unit; and a positioning control unit that determines whether or not the category in association with the specified position matches with the category determined by the category determining unit if position information obtained by the positioning unit is determined to belong to the region, and changes the positioning conditions of the positioning unit based on determination results.

In order to attain the above mentioned purpose, in accordance with a fourth aspect of the present invention, there is provided a positioning method of changing positioning conditions of a positioning unit that performs positioning of position information at each time when the predetermined positioning conditions are met, the method including: a position setting step of setting a specified position from among one or more specified positions, each associated with a category from among a plurality of types of categories and stored in the storage unit; a region setting step of setting a region of a size corresponding to a category to which the specified position set in the position setting step belongs, in association with the specified position; a region determining step of determining whether or not position information obtained by the positioning unit belongs to the region set in the region setting step; and a positioning control step of changing the positioning conditions of the positioning unit based on determination results determined in the region determining step.

In order to attain the above mentioned purpose, in accordance with a fifth aspect of the present invention, there is provided a positioning method of changing positioning conditions of a positioning unit that is prepared to performs positioning of position information at each time when the predetermined positioning conditions are met, wherein the positioning unit is prepared to perform positioning of positioning information where an imaging unit photographs a subject and acquiring photographed image information, the method including: a category determining step of determining, from among the plurality of types of categories, which category the position information positioned by the positioning unit in a time period related to a time when the imaging unit performs photographing belongs to; a region setting step of selecting a category based on determination results determined in the category determining step; extracting position information of the specified position belonging to the category thus selected, from among one or more specified positions, each associated with a category from among the plurality of types of categories and stored in the storage unit, and setting a region of a size corresponding to the category to which the specified position thus extracted belongs, in association with the specified position; a region determining step of determining whether or not the position information obtained by the positioning unit belongs to the region set in the region setting step; and a positioning control step of changing the positioning conditions of the positioning unit based on determination results determined in the region determining step.

In order to attain the above mentioned purpose, in accordance with a sixth aspect of the present invention, there is provided a positioning method of changing positioning conditions of a positioning unit that is prepared to performs positioning of position information at each time when the predetermined positioning conditions are met, wherein the positioning unit is prepared to perform positioning of positioning information where an imaging unit photographs a subject and acquiring photographed image information, the method including: a category determining step of determining, from among the plurality of types of categories, which category the position information positioned by the positioning unit in a time period related to a time when the imaging unit performs photographing belongs to; a region setting step of setting a region of a size corresponding to a category to which a specified position associated with a category from among the plurality of types of categories and stored in a storage unit belongs to; a region determining step of determining whether or not position information obtained by the positioning unit belongs to the region set in the region setting step; and a positioning control step of determining whether or not the category in association with the specified position matches with the category determined in the category determining step if position information obtained by the positioning unit is determined to belong to the region, and changing the positioning conditions of the positioning unit based on determination results.

In order to attain the above mentioned purpose, in accordance with a seventh aspect of the present invention, there is provided a storage medium having stored therein a program executable by a computer for inputting a positioning result from a positioning unit that performs positioning of position information at each time when predetermined positioning conditions are met, and changes the positioning conditions of the positioning unit, the program causes the computer to function as: a position setting unit that sets a specified position from among specified positions each associated with a category from among a plurality of types of categories and stored in a storage unit; a region setting unit that sets a region of a size corresponding to a category to which the specified position set by the position setting unit belongs, in association with the specified position; a region determining unit that determines whether or not the positioning result inputted by the positioning unit belongs to the region set by the region setting unit; and a positioning control unit that changes the positioning conditions of the positioning unit based on determination results determined by the region determining unit.

In order to attain the above mentioned purpose, in accordance with an eighth aspect of the present invention, there is provided a storage medium having stored therein a program executable by a computer for inputting a positioning result from a positioning unit that performs positioning of position information at each time when predetermined positioning conditions are met, and changes the positioning conditions of the positioning unit, the program causes the computer to function as: a category determining unit that determines, from among a plurality of types of categories, which category the position information positioned by the positioning unit in a time period related to a time when the imaging unit performs photographing belongs to; a region setting unit that selects a category based on determination results determined by the category determining unit, extracts position information of the specified position belonging to the category thus selected from a storage unit which stores position information of at least one specified position in association with a category from among a plurality of types of categories, and sets a region of a size corresponding to the category to which the specified position thus extracted belongs, in association with the specified position; a region determining unit that determines whether or not the positioning result inputted from the positioning unit belongs to the region set by the region setting unit; and a positioning control unit that changes the positioning conditions of the positioning unit based on determination results determined by the region determining unit.

In order to attain the above mentioned purpose, in accordance with a ninth aspect of the present invention, there is provided a storage medium having stored therein a program executable by a computer that inputs a positioning result from a positioning unit for performing positioning of position information at each time when predetermined positioning conditions are met, and changing the positioning conditions of the positioning unit, the program causes the computer to function as: a category determining unit that determines, from among a plurality of types of categories, which category the position information positioned by the positioning unit in a time period related to a time when the imaging unit performs photographing belongs to; a region setting unit that sets a region of a size corresponding to a category to which the specified position stored in storage unit which stores position information of at least one specified position, in association with a category of a plurality of types of categories; a region determining unit that determines whether or not position information obtained by the positioning unit belongs to the region set by the region setting unit; and a positioning control unit that determines whether or not the category in association with the specified position matches with the category determined by the category determining unit if position information obtained by the positioning unit is determined to belong to the region, and changes the positioning conditions of the positioning unit based on determination results.

BRIEF DESCRIPTION OF THE DRAWINGS

FIG. 3 is a table illustrating a table structure of a scenic site data table;

FIG. 4 is a table illustrating the table structure of a scenic site data table;

FIG. 5 is a table illustrating the table structure of a scenic site data table;

FIG. 6 is a table illustrating the table structure of a scenic site data table;

DETAILED DESCRIPTION OF THE INVENTION

Hereinafter, embodiments of the present invention will be explained with reference to the drawings. It should be noted that the scope of the invention is not limited to the illustrated examples.

First Embodiment

Figure 1:
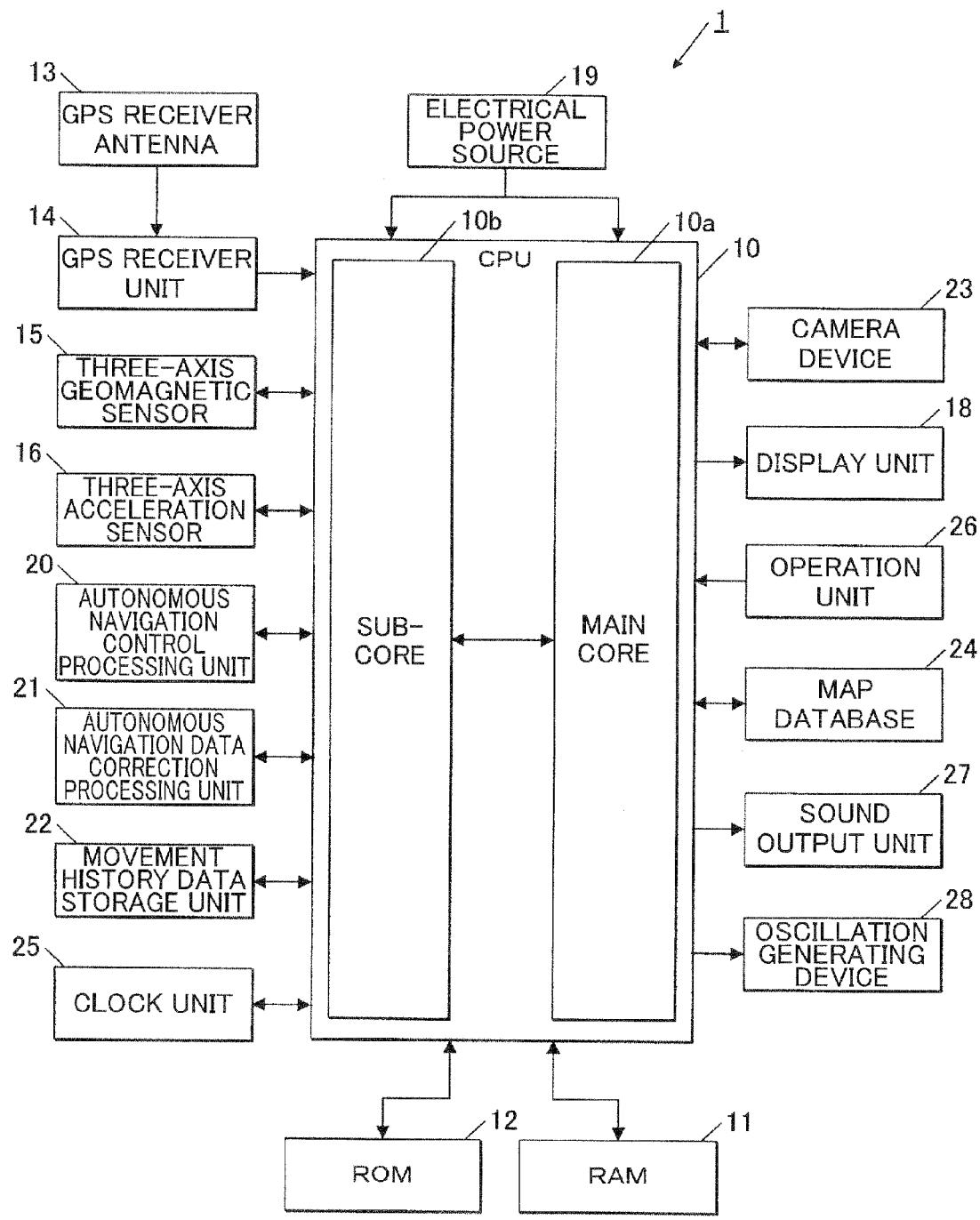
FIG. 1 is a block diagram showing the entirety of an imaging device according to a first embodiment of the present invention.

First, an imaging device 1 as a positioning device, which is the first embodiment of the present invention, will be explained with reference to FIG. 1.

The imaging device 1 of the present embodiment is a device that can store image data obtained from photographing in association with positional information of the photographing site, in a case of photographing operation having been performed while moving.

The imaging device 1 of the present embodiment performs recording of position data of each site on a travel route by performing positioning processing while moving. Specifically, this imaging device 1 includes a CPU (Central Processing Unit) 10 that performs overall control of the device, RAM (Random Access Memory) 11 that provides memory space for operations of the CPU 10, ROM (Read Only Memory) 12 in which a control program executed by the CPU 10 and control data are stored, a GPS receiver antenna 13 and a GPS receiver unit 14 for receiving transmitted data from GPS (Global Positioning System) satellites, a three-axis geomagnetic sensor 15 and a three-axis acceleration sensor 16 that are sensors for autonomous navigation, a display unit 18 that performs various information display and image display, an electrical power source 19 that supplies operating voltage to each unit, an autonomous navigation control processing unit 20 that performs positioning computing of autonomous navigation based on measurement data of the sensors (15, 16) for autonomous navigation, an autonomous navigation data correction processing unit 21 that performs correction computing of the positional data acquired from the autonomous navigation control processing unit 20, a movement history data storage unit 22 in which a series of positional data is accumulated along a travel route, a camera device 23 that performs photographing, a map database 24 in which map data of an entire country, scenic site data relating to the scenic sites in this map data, and the like are stored, a clock unit 25 that outputs current time information, an operation unit 26 that allows operation commands to be input from an outside entity, a sound output unit 27 that performs output of sound, an oscillation generating device 28 that causes the imaging device 1 to oscillate, and the like.

The CPU 10 is a multi-core CPU equipped with a main core 10a and a sub-core 10b. The main core 10a activates when the camera device 23 is made to operate. In addition, the sub-core 10b performs operations so long as operational voltage is supplied from the electrical power source 19, and mainly performs control of GPS positioning and autonomous navigation positioning described later. It should be noted that, although a multi-core CPU having two processors in the one CPU 10 is used in the present embodiment, the number of cores may be 1, or may be 3 or more. In addition, the CPU 10 may be constituted by a plurality of CPUs.

Based on a movement command from the CPU 10, the GPS receiver unit 14 performs demodulation processing of signals received via the GPS receiver antenna 13, and sends various data transmitted from GPS satellites to the CPU 10. The CPU 10 can acquire positional data representing the current position by performing predetermined positioning computing based on the transmitted data of GPS satellites.

The three-axis geomagnetic sensor 15 is a sensor that detects the direction of geomagnetism, and the three-axis acceleration sensor 16 is a sensor that detects acceleration in each of the three axis directions.

The autonomous navigation control processing unit 20 is adapted to assist in computational processing of the CPU 10, and inputs measurement data of the three-axis geomagnetic sensor 15 and the three-axis acceleration sensor 16 via the CPU 10 in predetermined sampling periods and calculates a direction of movement and an amount of movement of the imaging device 1 from these measurement data. Furthermore, positional data of a traveled site is obtained by cumulating vector data composed of the above-mentioned direction of movement and amount of movement thus calculated and then supplied to the CPU 10.

The autonomous navigation data correction processing unit 21 performs correctional computing for correcting the positional data calculated by the autonomous navigation control processing unit 20 to be more accurate positional data.

The movement history data storage unit 22 is constituted by RAM, nonvolatile memory, or the like, for example, and has movement history data recorded therein. The movement history data is data in which positional data acquired while the device is moving is sequentially entered.

The camera device 23 is a device that has an imaging element such as a CMOS (Complementary Metal Oxide Semiconductor) sensor or CCD (Charge-Coupled Device), a lens that allows for the formation of an image of a subject, and the like, and records the image of the subject formed in the imaging element by converting into a digital signal in accordance with a command of the CPU 10. The camera device 23 is provided with a storage device (storage medium) of high capacity, for example, and is adapted to have that image data acquired from photographing saved in this storage medium.

The map database 24 is constituted by a storage medium such as ROM, for example, and has recorded therein map data of the entire country of Japan, a scenic site data table in which scenic site data, which is described later, to be arranged in the map data is stored, and the like. This scenic site data table is tabulated by category as shown in FIGS. 3 to 6. It should be noted that the storage medium employed in the map database 25 of the present embodiment is not limited to ROM, and may be constituted by a high capacity storage device such as a HDD (Hard Disk Drive), a recording medium reading device in which CD-ROM and DVD-RAM, memory cards, or the like are placed, or the like.

The clock unit 25 is a so-called quartz clock and outputs current time information to the CPU 10. For this clock unit 25, appropriate correction is performed based on time data contained in transmitted data of GPS satellites received by the GPS receiver unit 14, for example.

The sound output unit 27 includes an amplifier, speaker and the like, and performs output of predetermined sounds according to sound output commands of the CPU 10.

The oscillation generating device 28 has an oscillator mounted to the rotating shaft of a motor, and causes oscillations to occur by causing the motor to rotate at high speed, for example. It should be noted that the oscillation generating device 28 may cause oscillations to occur by any other method, for example, and a device having a speaker that causes oscillations to occur by outputting sound may be applied.

A positioning interval setting program for acquiring positional data of each site on a travel route by jointly using position measurement by way of an autonomous navigation function and position measurement using GPS and for varying the conditions of position measurement using GPS is stored in the ROM 12. In addition to being stored in the ROM 12, this program can be stored in nonvolatile memory such as flash memory, a portable storage medium such as an optical disk, or the like that can be read by the CPU 10 through a data reading device, for example. In addition, such a program may take a form that is downloadable to the imaging device 1 via a communication line with a carrier wave as a medium.

Figure 2:
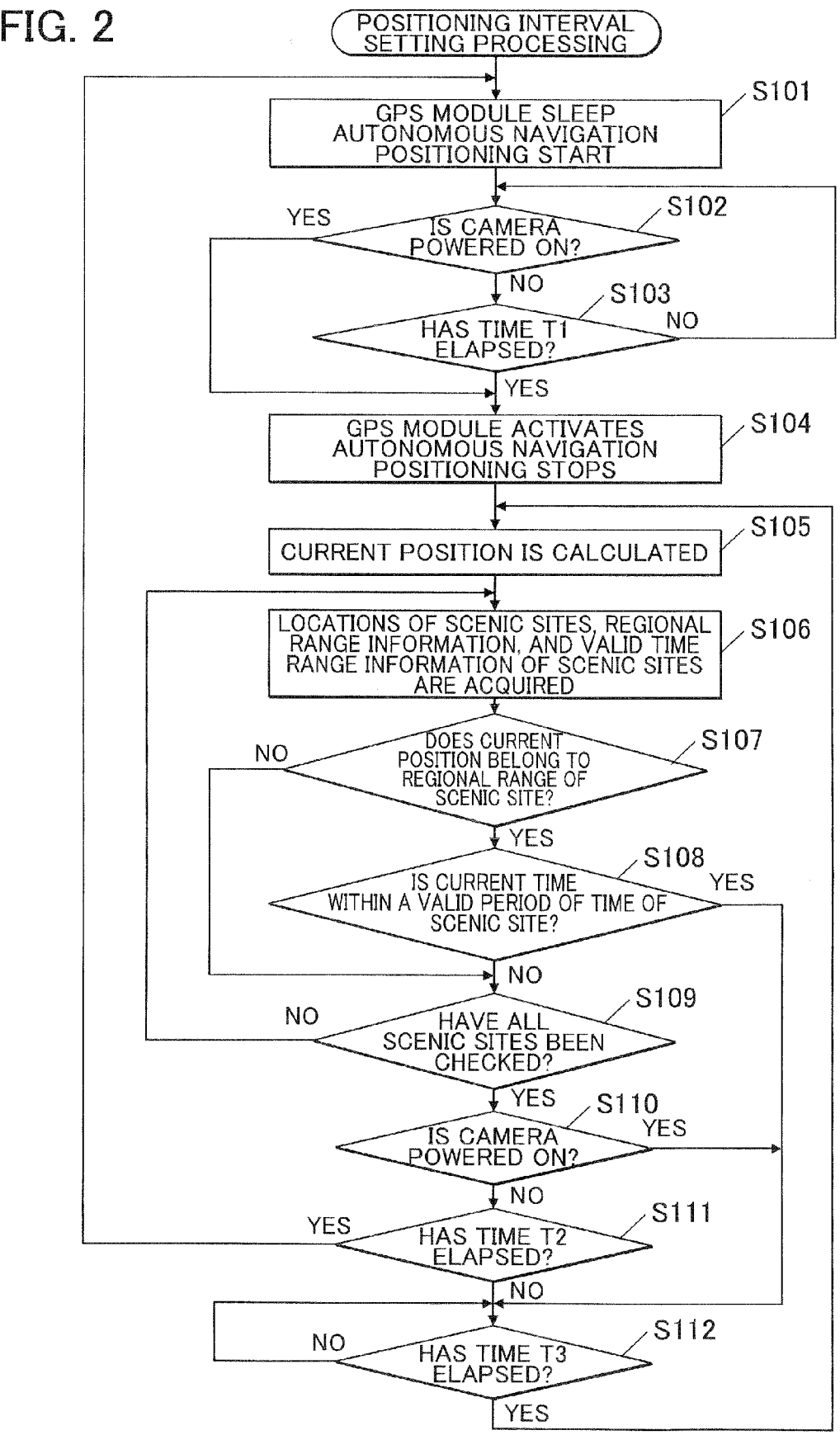
FIG. 2 is a flowchart showing a processing sequence of positioning interval setting processing of the first embodiment.

Next, positioning interval setting processing that is executed in the imaging device 1 thus constituted will be explained with reference to FIG. 2. This positioning interval setting processing is realized by reading out the positioning interval setting program stored in the ROM 12, and this being executed by the CPU 10. In addition, this positioning interval setting processing is executed when operating voltage is supplied to the sub-core 10b from the electrical power source 19. It should be noted that determining a position based on the transmitted data of GPS satellites is called GPS positioning and position measurement by way of an autonomous navigation function is called autonomous navigation positioning in the following explanation.

When the positioning interval setting processing is initiated, the CPU 10 causes functions of a device (GPS module) for performing GPS positioning such as the GPS receiver unit 14 to stop (sleep), and initiates autonomous navigation positioning (Step S101).

Next, the CPU 10 determines whether or not the camera device 23 has been turned ON (Step S102). If it is not determined that the electrical power source has been turned ON (Step S102: N), the CPU 10 executes the processing of Step S103. If, on the other hand, is determined that the electrical power source has been turned ON (Step S102: Y), the CPU 10 executes the processing of Step S104 without executing the processing of Step S103.

Then, in Step S103, the CPU 10 determines whether or not a time T1 has elapsed since the GPS module enters the sleep state (Step S103). Although this time T1 is set to 10 minutes, for example, it may be any other time. Then, the CPU 10 executes the processing of Step S102, if it is not determined that the time T1 has elapsed (Step S103: N). The CPU 10, on the other hand, executes the processing of Step S104, if it is determined that the time T1 has elapsed (Step S103: Y).

Next, in Step S104, the CPU 10 causes the GPS module to activate, and causes the autonomous navigation positioning to stop (Step S104).

Then, the CPU 10 performs positioning on the current position by way of GPS positioning, and stores positioning results in the movement history data storage unit 22 (Step S105). More specifically, the CPU 10 performs positioning by calculating the current position based on data from transmitted a plurality of GPS satellites received by the GPS receiver unit 14.

Then, the CPU 10 extracts one set of scenic site data from the scenic site data table stored in the map database 24, and acquires a location, regional range information, and valid time range information of a scenic site of the scenic site data thus extracted (Step S106). Herein, the location of a scenic site is expressed by longitude and latitude. The regional range information is information indicating a region within a predetermined radial distance from the location of the scenic site, and is specified by a table to which the scenic site data thus extracted belongs. It should be noted that this regional range is specified in each table. The valid time range information is information indicating a period of time that is available, and is specified by the table to which the scenic site data thus extracted belongs. Specifically, the valid time range information corresponds to the scenic site data thus extracted. It should be noted that the valid time range information may be set for each individual scenic site.

Next, the CPU 10 determines whether or not a current position belongs to the regional range of the scenic site, based on the positioning results of Step S105 and the regional range information of the scenic site table extracted in Step S106 (Step S107). If it is determined that the current position belongs to the regional range of the scenic site (Step S107: Y), the CPU 10 executes the processing of Step S108. On the other hand, if it is not determined that the current position belongs to the regional range of the scenic site (Step S107: N), the CPU 10 advances to the processing of Step S109 without executing the processing of Step S108.

Next, the CPU 10 extracts current time information from the clock unit 25, compares the current time with the valid time range information of the scenic site data extracted in Step S106, and determines whether or not the current time is within a valid period of time of the scenic site (Step S108). If it is determined that the current time is within a valid period of time (Step S108: Y), the CPU 10 advances to the processing of Step S112, which will be described later. If, on the other hand, it is not determined that the current time is within a valid period of time (Step S108: N), the CPU 10 executes the processing of Step S109.

Then, in Step S109, the CPU 10 determines whether or not the processing of Steps S106 to S108 has been performed for all of the scenic site data stored in the scenic site data table, i.e., all of the scenic sites have been checked regarding whether or not the current position belongs to a regional range thereof and whether or not the current time is within a valid period of time thereof (Step S109). If it is determined that all of the scenic sites have been checked (Step S109: Y), the CPU 10 executes the processing of Step S110. If it is not determined that all of the scenic sites have been checked (Step S109: N), the CPU 10 advances to the processing of Step S106, extracts other scenic site data, and repeats the same processing of step S106 to S108.

Next, in Step S110, the CPU 10 determines whether or not the camera device 23 is powered ON (Step S110). If it is not determined that the camera device 23 is powered ON (Step S110: N), the CPU 10 executes the processing of Step S111. If it is not determined that the camera device 23 is powered ON (Step S110: N), the CPU 10 advances to the processing of Step S112 without executing the processing of Step S111.

Next, in Step S111, the CPU 10 determines whether or not a time T2 has elapsed since the GPS module was activated in Step S104 (Step S111). Herein, although the time T2 is set to 1 minute, for example, the time T2 may be set to any other time. The CPU 10 executes the processing of Step S112 if it is not determined that the time T2 has elapsed (Step S111: N). If it is determined that the time T2 has elapsed (Step S111: Y), the CPU 10 advances to the processing of Step S101 and puts the GPS module in the sleep state.

Next, in Step S112, the CPU 10 waits for a time T3 to elapse since the GPS positioning was performed in Step S105 (Step S112), and then advances to the processing of Step S105. Herein, although the time T3 is set to 1 second, for example, it may be set to any other time.

When the camera device 23 is powered ON, the imaging device 1 of the present embodiment performs GPS positioning at each time T3 in the above way, until the camera device 23 is powered OFF. In addition, the imaging device 1 of the present embodiment activates the GPS modules at each time T1 and continuously performs GPS positioning at each time T3 for the time T2 when the camera device 23 is in the OFF state. The imaging device 1 of the present embodiment, on the other hand, continuously performs GPS positioning at each time T3 without the GPS module entering the sleep state when the imaging device 1 is located within a fixed region from the scenic site in a valid period of time. In other words, with the imaging device 1 of the present embodiment, the positioning conditions of GPS positioning are changed depending upon whether the imaging device 1 is located within a fixed range from the scenic site in a valid period of time thereof.

In this way, according to the present embodiment, since the likelihood for photographing to be performed by the camera device 23 within a fixed range from a scenic site is high, the GPS module is made active on a steady basis and the positioning opportunities by GPS positioning are increased so that accurate position information of a photographing position can always be acquired; whereas, since the likelihood for photographing to be performed by the camera device 23 outside a fixed region from the scenic site is low, position information is acquired to some degree by causing the GPS module to activate at each predetermined time, while allowing for the consumption of electricity to be suppressed.

Next, the table structure of a scenic site data table will be explained with reference to FIGS. 3 to 6.

The scenic site data table is constituted by a plurality of tables, and regional range information and valid time range information are respectively stored in association with each table. Herein, the regional range information is set in advance by taking account of the photograph subject of the scenic site, and taking account of a range around the location of the scenic site in which photographing is likely to be performed. In addition, the valid time range information is set in advance taking into account a period of time in which photographing of the scenic site is likely to be performed. This regional range information and valid time range information may be set arbitrarily.

In addition, a plurality of scenic site data containing the name of the scenic site and longitude and latitude information representing the location thereof is stored in each table of the scenic site data table. Herein, the longitude and latitude information is information representing the longitude and latitude. In the present embodiment, the longitude is represented as the X axis and the latitude represented as the Y axis. It should be noted that, in the present embodiment, east longitude is represented by positive, while west longitude is represented by negative. In addition, north latitude is represented by positive, while south latitude is represented by negative.

The scenic site data table is tabulated into each category of scenic site, for example, and includes a mountain, beach, lake data table, a bridge and dam data table, a park, garden, and castle data table, and a shrine, temple, and building data table, and the like. The mountain, beach, lake data table has stored therein scenic site data relating to scenic sites of mountain, beach, and lake, such as that shown in FIG. 3. The bridge and dam data table has stored therein scenic site data relating to scenic sites of bridge and dam, such as that shown in FIG. 4. The park, garden, and castle data table has stored therein scenic site data relating to scenic sites of park, garden, and castle, such as that shown in FIG. 5. The shrine, temple, and building data table has stored therein scenic site data relating to scenic sites of shrine, temple, and building, such as that shown in FIG. 6.

In the mountain, beach, and lake data table, a radial distance of 2 km is stored as the regional range information, and 6 AM to 8 PM is stored as the valid time range information as shown in FIG. 3. Then, scenic site data relating to mountains such as Mt. Fuji and Mt. Aso, scenic site data relating to beaches such as Matsushima and Katsurahama, and scenic site data relating to lakes such as Lake Toya and Lake Biwa are respectively stored as scenic site data.

For the bridge and dam data table, a radial distance of 1 km is stored as the regional range information, and 6 AM to 8 PM is stored as the valid time range information, as shown in FIG. 4. Then, scenic site data relating to bridges such as Rainbow Bridge and Naruto Oohashi and scenic site data relating to dams such as Okudatami Dam and Kurobe Dam are respectively stored as scenic site data.

For the park, garden, and castle data table, a radial distance of 500 m is stored as the regional range information, and 9 AM to 6 PM is stored as the valid time range information, as shown in FIG. 5. Then, scenic site data relating to parks such as Oze National Park and Uenoonshi Park, scenic site data relating to gardens such as Kairakuen and Kourakuen, and scenic site data relating to castles such as the Edo Castle ruins and Himeji Castle are respectively stored as scenic site data.

For the shrine, temple, and building data table, a radial distance of 200 m is stored as the regional range, and 9 AM to 6 PM is stored as the valid time range information, as shown in FIG. 6. Then, scenic site data relating to shrines and temples such as the Grand Shrine at Ise and Izumo Temple and scenic site data relating to buildings such as Tokyo Tower and Tsutenkaku are respectively stored as scenic site data.

Next, the sizes of regional ranges set in each table will be explained with reference to FIGS. 7 and 8. It should be noted that the scaling of the maps shown in FIGS. 7 and 8 will be explained as being substantially the same.

Figure 7:
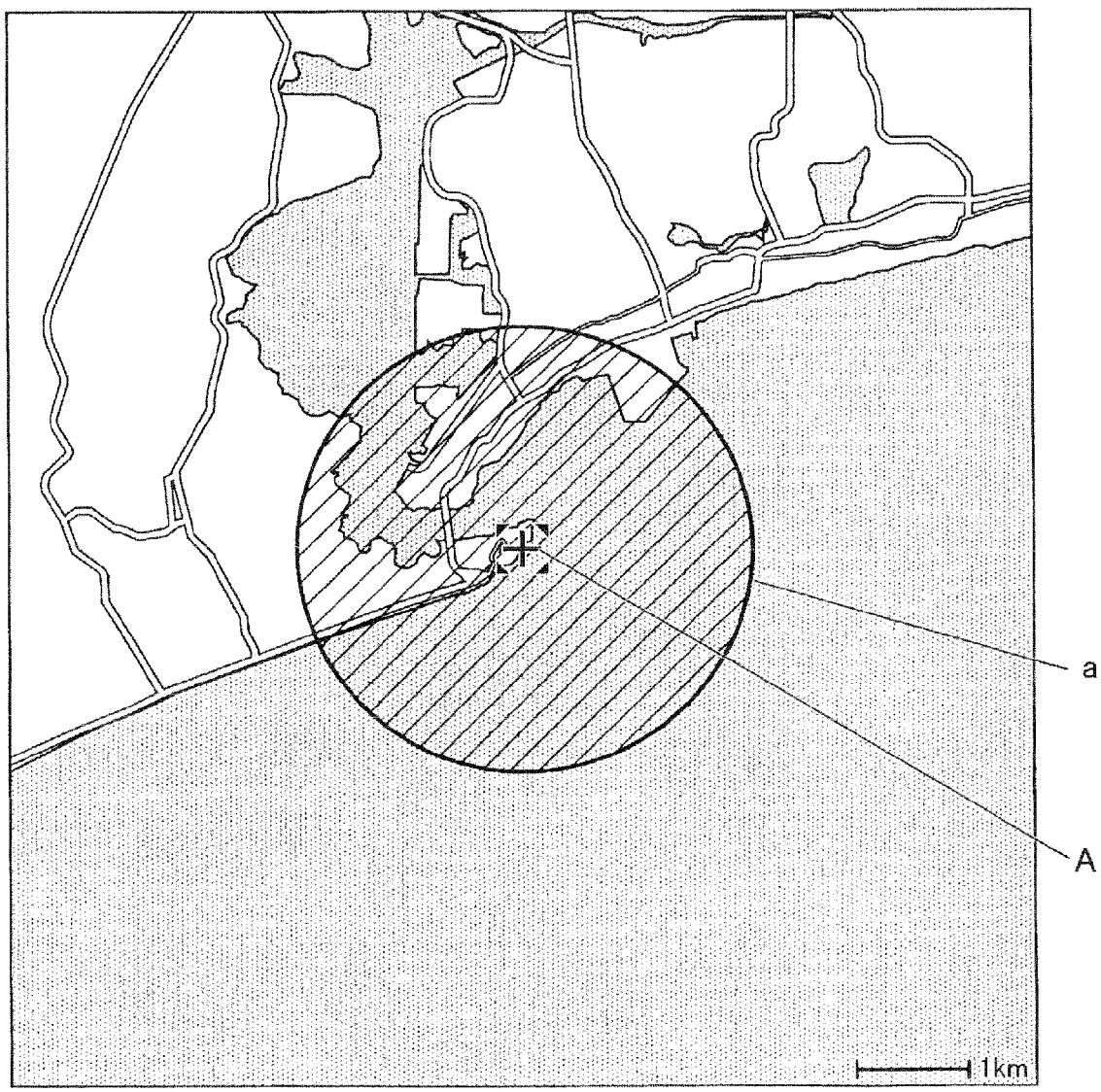
FIG. 7 is a map illustrating a regional range corresponding to a scenic site.

FIG. 7 shows the location of a scenic site and the regional range that is set when Katsurahama of Kouchi Prefecture is extracted as the scenic site in the aforementioned positioning interval setting processing. Katsurahama belongs to the category of mountain, beach, and lake, and the scenic site data relating to Katsurahama is stored in the aforementioned mountain, beach, and lake data table. Then, since the regional range information stored in the mountain, beach, and lake data table is 2 km, the region that is set becomes the range indicated by "a" around Katsurahama A, as shown in FIG. 7.

Figure 8:
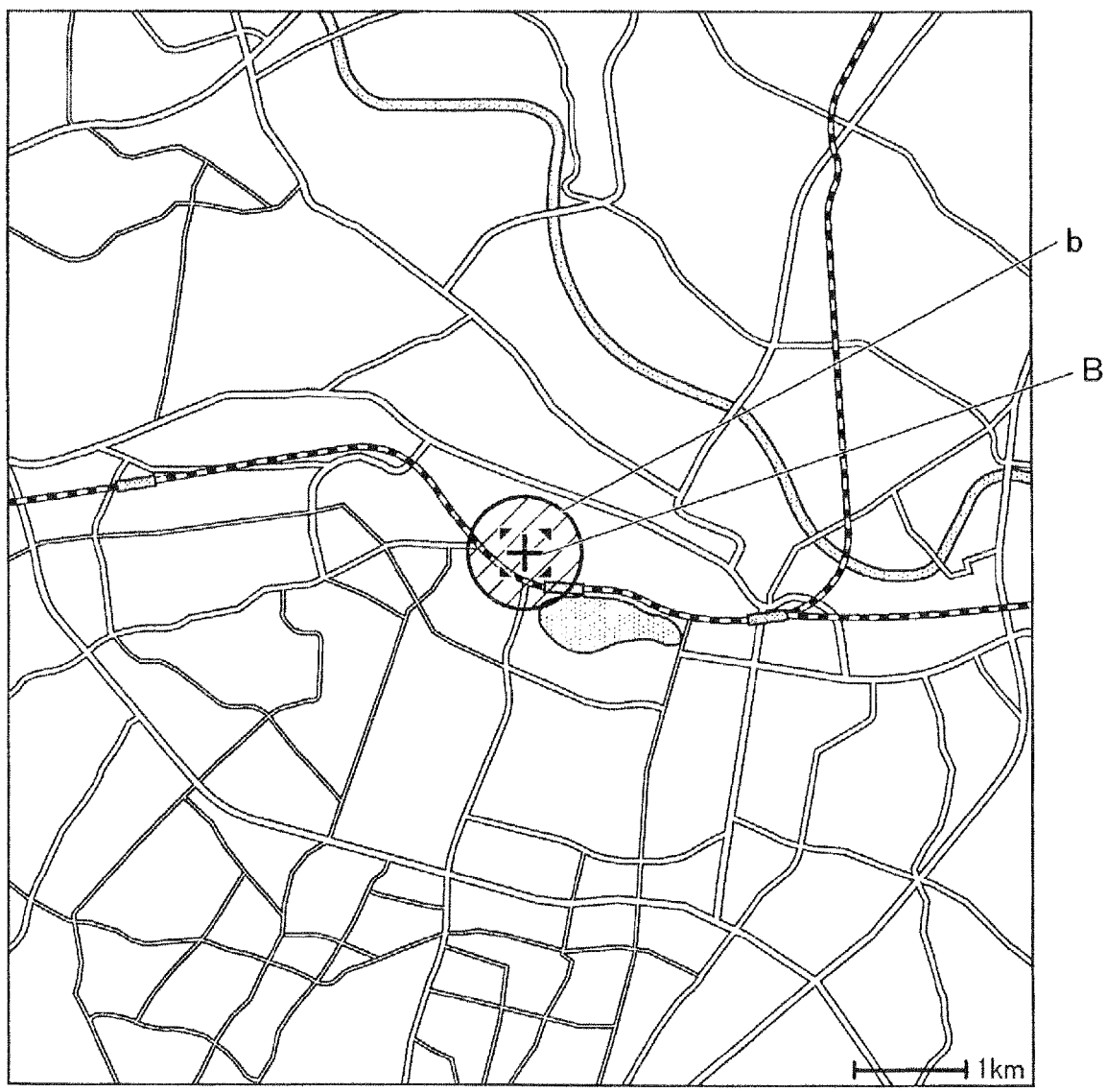
FIG. 8 is a map illustrating a regional range corresponding to a scenic site.

FIG. 8 shows the location of a scenic site and the regional range that is set when Kairakuen of Ibaraki Prefecture is acquired as the scenic site in the aforementioned positioning interval setting processing. Kairakuen belongs to the category of park, garden, and castle, and the scenic site data relating to Kairakuen is stored in the aforementioned park, garden, and castle data table. Then, since the regional range information stored in the park, garden, and castle data table is 500 m, the region that is set becomes the range indicated by "b" around Kairakuen B, as shown in FIG. 8. In this way, the size of the regional range set for Kairakuen differs from the size of the regional range set for Katsurahama.

In the present embodiment, since scenic sites are categorized according to the subjects to be photographed by the camera device 23, and the size of the range of a region used to vary the positioning conditions by GPS positioning is set in each category, the positional accuracy can be improved in accordance with changes in purpose of photographing, i.e., use, while suppressing the consumption of electrical power, and to improve the convenience to the user.

Second Embodiment

Furthermore, an imaging device 1 according to a second embodiment of the present invention will be explained. It should be noted that, since constitutional elements of the imaging device 1 according to the second embodiment is similar to the constitutional elements of the first embodiment shown in FIG. 1, explanations thereof will be omitted.

First, positioning interval setting processing that is executed in the imaging device 1 of the second embodiment will be explained with reference to FIG. 9. It should be noted that only an outlined explanation will be made for the contents of processing similar to the first embodiment.

When positioning interval setting processing of the second embodiment is initiated, the CPU 10 causes the GPS module to enter a sleep state, and initiates autonomous navigation positioning (Step S201).

Next, the CPU 10 determines whether the camera device 23 has been powered ON (Step S202). If it is not determined that the electrical power source has been turned ON (Step S202: N), the CPU 10 executes the processing of Step S203, and if it is determined that the electrical power source has been turned ON (Step S202: Y), the CPU 10 executes the processing of Step S204 without executing the processing of Step S203.

Then, in Step S203, the CPU 10 determines whether or not a time T4 has elapsed since the GPS module entered the sleep state (Step S203). Although this time T4 is set to 1 minute, for example, it may be any other time. Then, if it is not determined that the time T4 has elapsed (Step S203: N), the CPU 10 executes the processing of Step S202. If it is determined that the time T4 has elapsed (Step S203: Y), the CPU 10 executes the processing of Step S204.

Next, in Step S204, after the CPU 10 has caused the GPS module to activate and has caused the autonomous navigation positioning to stop (Step S204), the CPU 10 performs positioning of the current position by way of GPS positioning, and stores the results thereof in the movement history data storage unit 22 (Step S205).

Then, the CPU 10 refers to the scenic site data table of the map database 24, and specifies scenic sites belonging to a category user set, which are scenic sites close to the current position thus positioned in Step S205 (Step S206). Herein, specification of scenic sites near the current position is performed by extracting scenic sites coming within a range of a radial distance of 10 km from the current position, for example, from the scenic site data table. It should be noted that setting of categories by the user will be explained later.

Then, the CPU 10 acquires regional range information and valid time range information from the scenic site data of scenic sites specified from the scenic site data table stored in the map database 24 in Step S206 (Step S207).

Next, the CPU 10 determines whether or not the current position comes under the regional range of the scenic site based on the positioning results of Step S205 and the regional range information of the scenic site data acquired in Step S207 (Step 208). The CPU 10 executes the processing of Step S209 if it is determined that the current position comes under the regional range of the scenic site (Step S208: Y). The CPU 10 advances to the processing of Step S213 if it is not determined that the current position comes under the regional range of the scenic site (Step S208: N).

Next, in Step S209, the CPU 10 extracts current time information from the clock unit 25, compares with the valid time range information of the scenic site data acquired in Step S207, and determines whether or not the current time is within a valid period of time of the scenic site (Step S209). The CPU 10 advances to the processing of Step S210 if it is determined that the current time is within a valid period of time (Step S209: Y). On the other hand, the CPU 10 advances to the processing of Step S213 if it is not determined that the current time is within a valid period of time (Step S209: N).

Then, in Step S210, the CPU 10 determines whether or not the camera device 23 is powered ON (Step S210). The CPU 10 drives either one or both of the sound output unit 27 and oscillation generating device 28, notifies the user possessing the imaging device 1 of being within the regional range of the scenic site (Step S211), and then advances to the processing of Step S214 if it is not determined that the camera device 23 is powered ON (Step S210: N). On the other hand, the CPU 10 performs display on a display region of the display unit 18 of the fact of being within the regional range of the scenic site (Step S212), and then advances to the processing of Step S214, in a case of having determined that the camera device 23 is powered ON (Step S210: Y).

In addition, in Step S213, the CPU 10 determines whether or not the camera device 23 is powered ON (Step S213). The CPU 10 advances to the processing of Step S215 in a case of having determined that the camera device 23 is powered ON (Step S213: Y); whereas, the CPU 10 advances to the processing of Step S201 and puts the GPS module in the sleep state in a case of not having determined that the camera device 23 is powered ON (Step S213: N).

Then, in Step S214, the CPU 10 waits for a time T5 since GPS positioning was performed in Step S205 to elapse (Step S214), and advances to the processing of Step S205. Herein, although the time T5 is set to 1 second, for example, it may be set to any other time.

Figure 10:
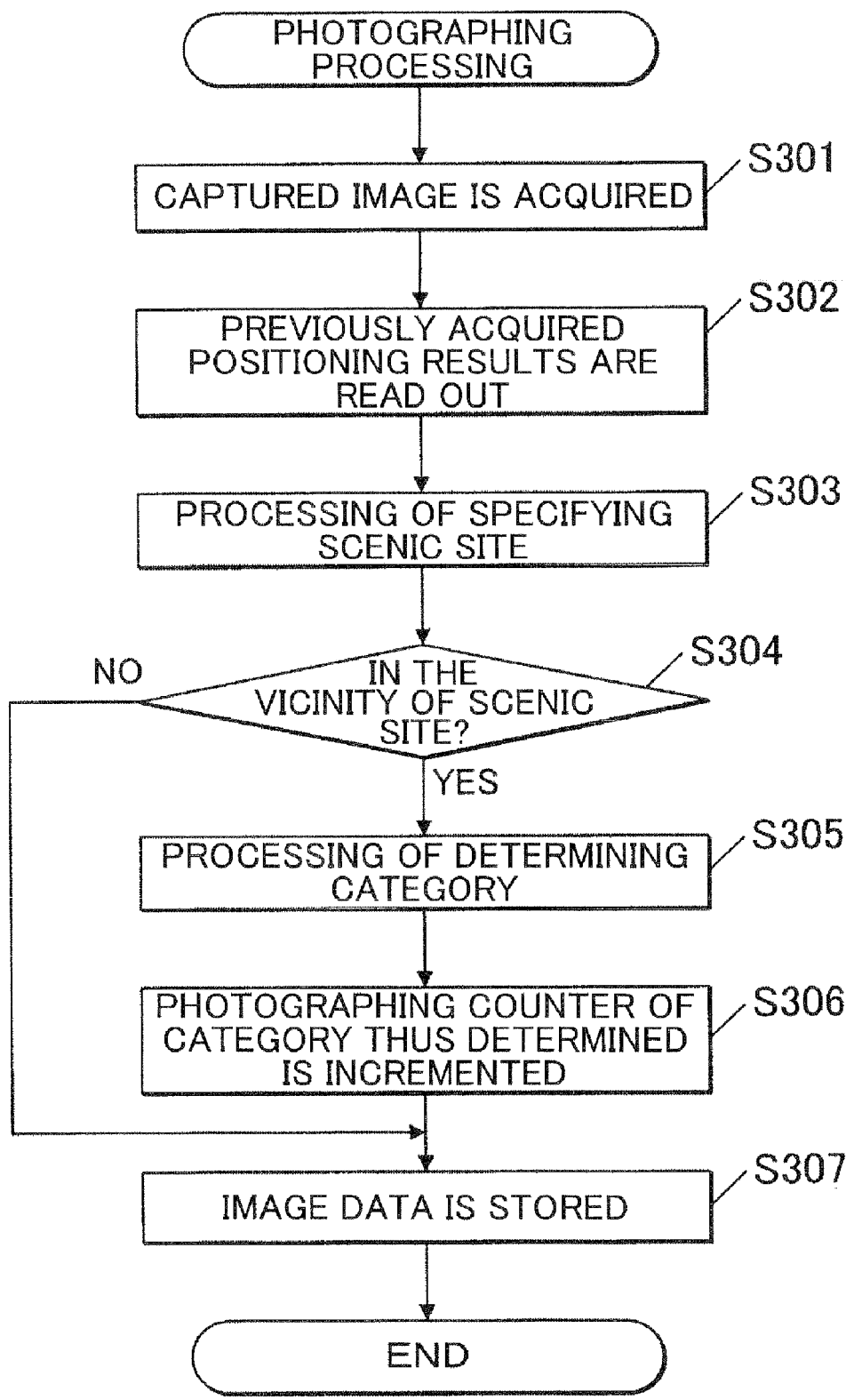
FIG. 10 is a flowchart showing a processing sequence of photographing processing of the second embodiment.

Next, photographing processing executed in the imaging device 1 according to the second embodiment will be explained with reference to FIG. 10. This photographing processing is realized by a photographing program stored in the ROM 12 being read out, and this being executed by the CPU 10.

First, the CPU 10 acquires image data of an image captured by the camera device 23 (Step S301).

Then, the CPU 10 reads out previously acquired positioning results (position data) by way of GPS positioning from the movement history data storage unit 22 (Step S302), and performs processing of specifying a scenic site closest to the position data thus read out by referring to the scenic site data table of the map database 24 (Step S303).

Then, the CPU 10 determines whether the position thus photographed comes under the regional range of the scenic site, i.e., whether photographing was performed in the vicinity of the scenic site, based on the regional range information of the scenic site data of the scenic site specified (Step S304). The CPU 10 determines which category among the category relating to mount, beach, and lake, the category relating to bridge and dam, the category relating to park, garden, and castle, and the category relating to shrine, temple, and building that the category to which the scenic site specified belongs is (Step S305), if it is determined that photographing was performed in the vicinity of the scenic site (Step S304: Y). Then, the CPU 10 increments a photographing counter of the category specified that is stored in the RAM 11 (Step S306), for example, and executes the processing of Step S307.

On the other hand, in Step S304, the CPU 10 executes the processing of Step S307 without executing the processing of Step S305 and Step S306. If it is not determined that photographing was performed in the vicinity of the scenic site (Step S304: N).

In Step S307, the CPU 10 stores image data acquired in Step S301 along with the position data read out in Step S302 in a storage device of the camera device 23 (Step S307).

With the present embodiment, positions at which photographing has been performed are collected in each category by carrying out the above processing.

Figure 11:
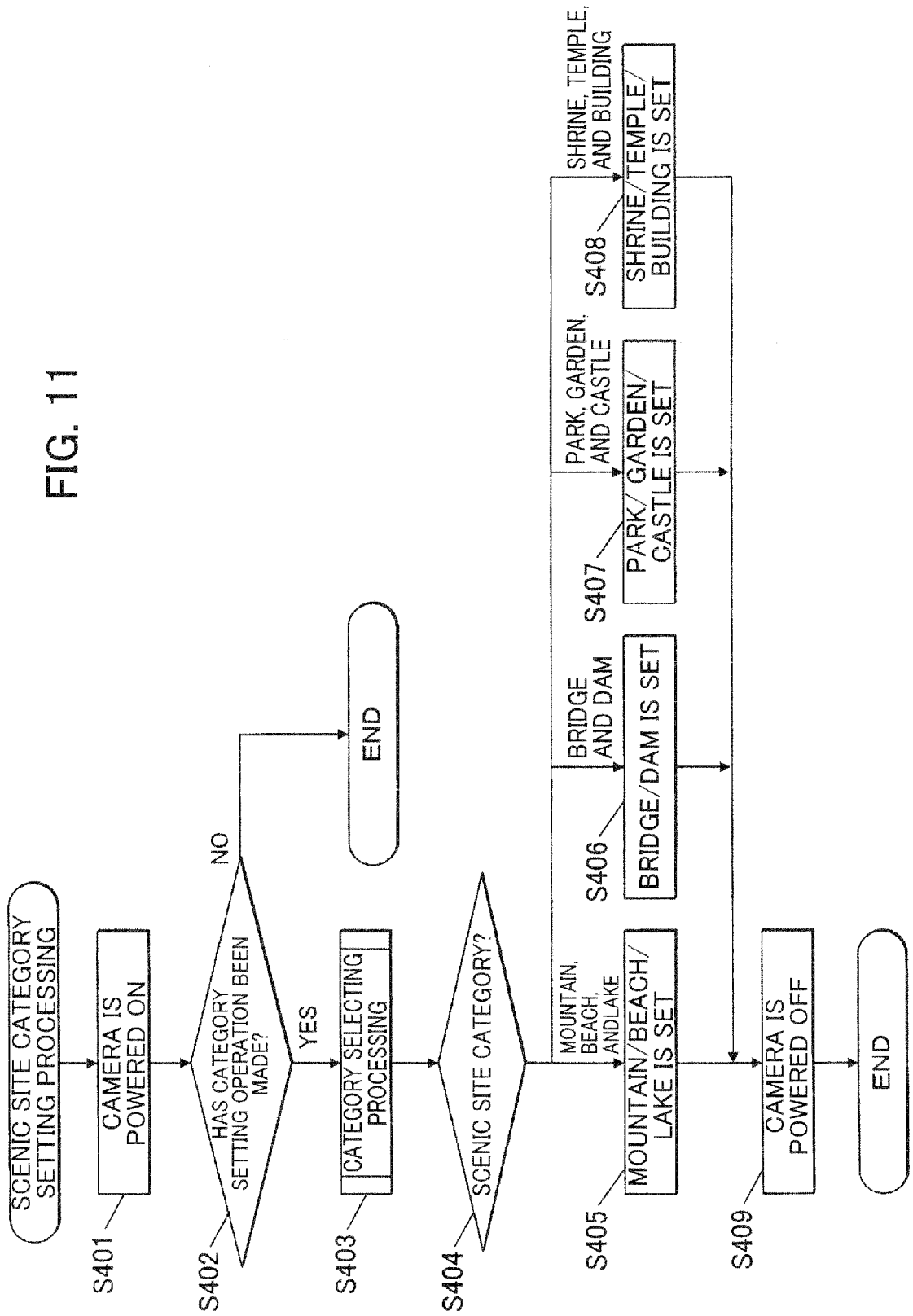
FIG. 11 is a flowchart showing a processing sequence of scenic site category setting processing of the second embodiment.

Next, scenic site category setting processing executed in the imaging device 1 according to the second embodiment will be explained with reference to FIG. 11. This scenic site category setting processing is realized by a scenic site category setting program stored in the ROM 12 being read out, and this being executed by the CPU 10.

First, after the camera device 21 has been turned ON (Step S401), the CPU 10 determines whether or not there has been a category setting operation of a user via the operation unit 26 (Step S402). After the CPU 10 has performed category selection processing to perform selection of a category (Step S403), in a case of having determined that there has been a setting operation of a category (Step S402: Y), the CPU 10 executes the processing of Step S404; whereas, the CPU 10 ends this processing in a case of not having determined that there has been a setting operation of a category (Step S402: N). It should be noted that category setting processing will be explained later.

Next, the CPU 10 determines which category was selected in Step S403 (Step S404). If the category selected is the category relating to mounting, beach, and lake, the CPU 10 sets the category of user setting to mountain, beach, and lake (Step S405). If the category selected is the category relating to bridge and dam, the CPU 10 sets the category of user setting to bridge and dam (Step S406). If the category selected is the category relating to park, garden, and castle, the CPU 10 sets the category of user setting to park, garden, and castle (Step S407). If the category selected is the category relating to shrine, temple, and building, the CPU 10 sets the category of user setting to shrine, temple, and building (Step S408).

Then, after having executed any of Step S405 to Step S408, the CPU 10 waits for the camera device 23 to be turned OFF (Step S409), and ends this processing.

Figure 12:
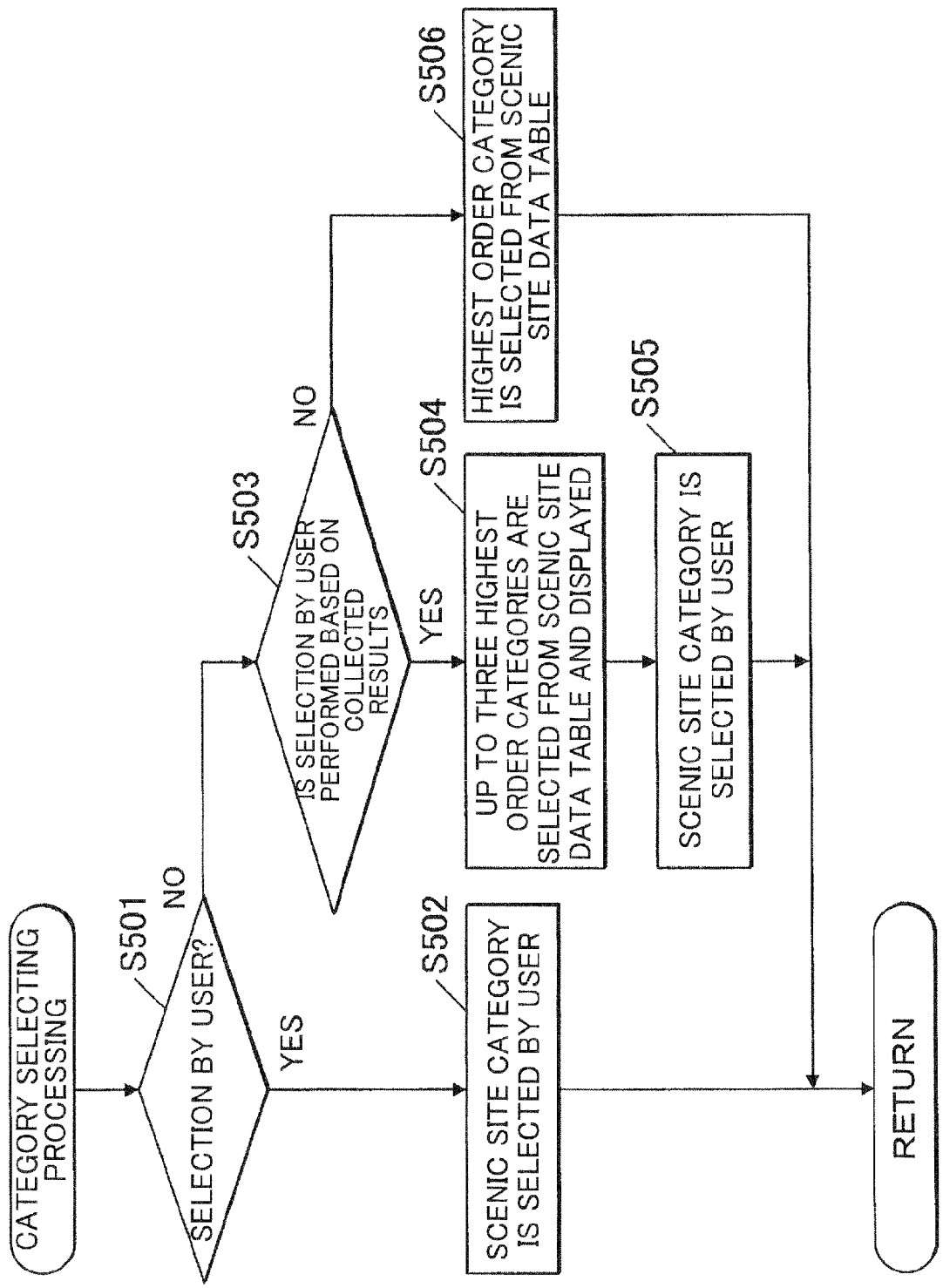
FIG. 12 is a flowchart showing a processing sequence of category selection processing of the second embodiment.

Next, category selection processing executed in Step S403 of the scenic site category setting processing shown in FIG. 11 will be explained with reference to FIG. 12. This category selection processing is realized by a category selection program stored in the ROM 12 being read out, and this being executed by the CPU 10.

First, the CPU 10 determines whether or not to perform selection of a category by way of arbitrary selection for the user (Step S501). Specifically, the CPU 10 determines, according to an operation by way of the operation unit 26 of the user, whether or not an operation has been performed to select a category to be the user's request. The CPU 10 selects any from among the category relating to mountain, beach, and late, the category relating to bridge and dam, the category relating to park, garden, and castle, and the category relating to shrine, temple, and building in response to an operation of the operation unit 26 by the user (Step S502), in a case of having determined to perform arbitrary selection for the user (Step S501: Y), and then ends this processing.

On the other hand, in Step S501, the CPU 10 determines whether or not to perform selection by the user from among categories extracted based on the results collected by way of the aforementioned photographing processing being executed (Step S503), in a case of not having determined to perform arbitrary selection for the user (Step S501: N). The CPU 10 refers to the photographing counter stored in the RAM 11, extracts and displays on the display unit 18 the three highest order categories having the largest counter values, and waits for receipt of an operation from the operation unit 26 of the user (Step S504), in a case of having determined to perform selection by the user from among the categories thus extracted (Step S503: Y). In other words, the CPU 10 determines the preference of the user by extracting the three highest order categories in regards to in which category photographing of scenic sites had commonly been performed, and further, operates so as to make the category for which the user has the most interest selected from among these.

Then, after having selected any from among the three highest order categories in response to an operation by way of the operation unit 26 (Step S505), the CPU 10 ends this processing.

On the other hand, in Step S503, the CPU 10 refers to the photographing counter stored in the RAM 11, and selects the category having the highest counter value (Step S506), and then ends this processing, in a case of not having determined to perform selection by the user from the categories thus extracted (Step S503: N). In other words, the CPU 10 judges the preference of the user by determining in which category photographing of scenic sites has most commonly been performed.

Figure 16:
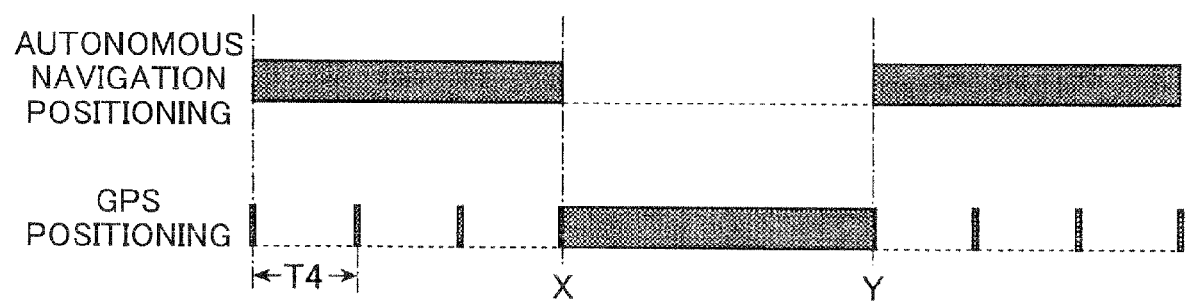
FIG. 16 is a chart illustrating positioning intervals of GPS positioning.

According to the second embodiment above, the preference of the user can be judged based on the selections by the user, the history of photographing positions of the user, etc., and in a case arising in which the user comes into a vicinity of a scenic site of such a category where the user is likely to perform photographing, it is possible to accurately record position information of the photographing position by causing the GPS module to be continuously active, and then shortening the positioning interval. On the other hand, in a case of the user being uninterested and the likelihood of photographing being low even if being in the vicinity of a scenic site, it is possible to suppress the consumption of electrical power by lengthening the GPS positioning interval. In other words, the GPS module activates at each time T4 and GPS positioning is performed, while autonomous navigation positioning is continuously performed in the sleep state of the GPS module, as shown in FIG. 16. Then, at the timing of X, if the user comes under a valid period of time in a regional range of a scenic site belonging to the category user set, the GPS module maintains a driven state, and GPS positioning is performed at each time T5. Thereafter, until the timing of Y, i.e., until leaving from the regional range or lapsing of the valid period of time of the scenic site, the operations thereof are continuously performed. Furthermore, according to the second embodiment, in a case arising of coming into the vicinity of a scenic site belonging to a favored category of the user, due to informing the user by sound and oscillation or by display, for example, the fact of being a location that would be of interest to the user can be notified despite being a scenic site unknown to the user, and thus it is possible to raise the convenience to the user.

Next, any other behavior of positioning interval setting processing according to the second embodiment will be explained with reference to FIG. 13. It should be noted that, in FIG. 13, for steps of performing the same processing as the positioning interval setting processing shown in FIG. 9, the step number is the same, and explanations for the processing contents thereof are omitted.

Figure 13:
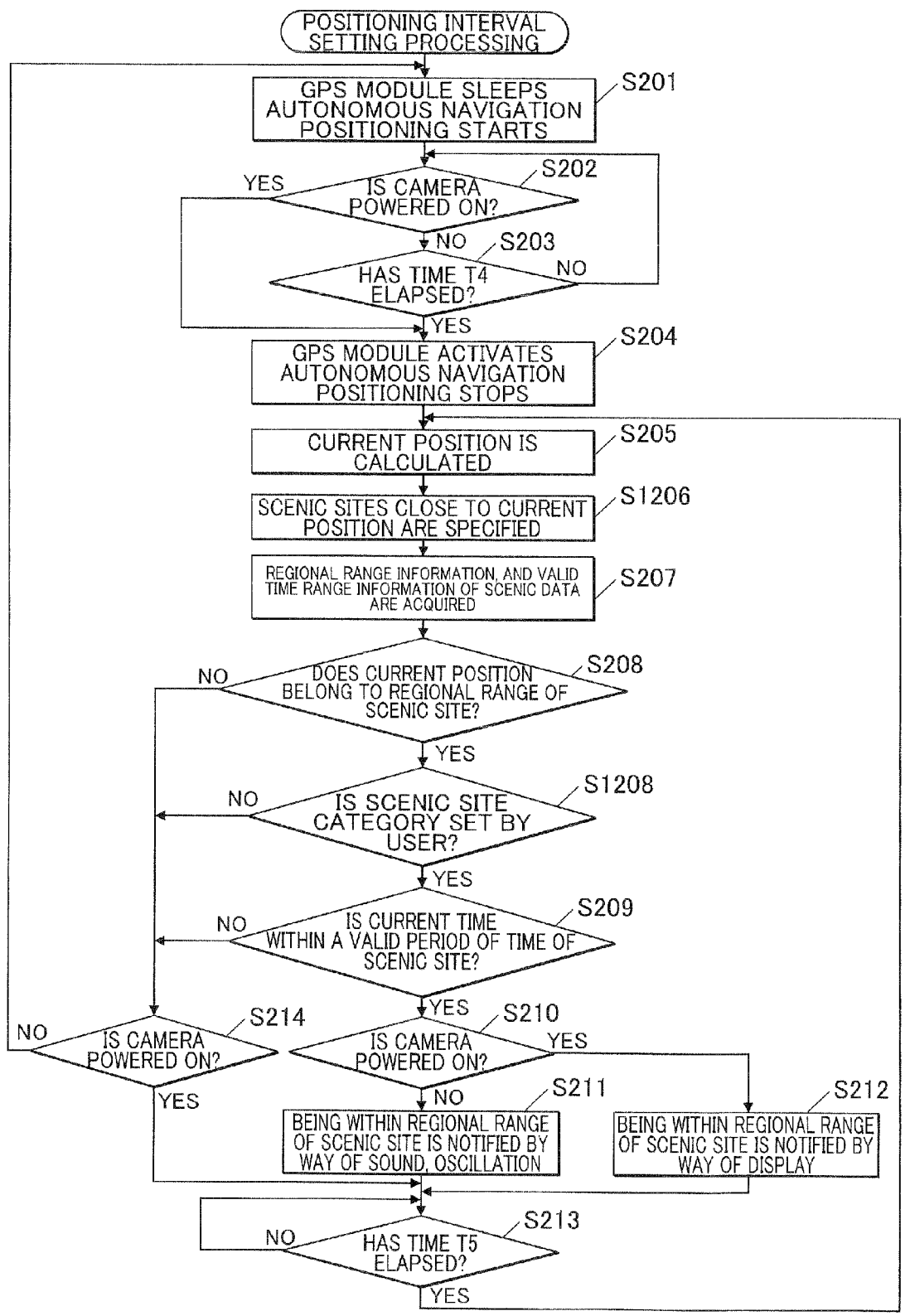
FIG. 13 is a flowchart showing a another processing sequence of positioning interval setting processing of the second embodiment.

As shown in FIG. 13, after having executed Step S201 to Step S205, the CPU 10 refers to the scenic site data table of the map database 24, and specifies a scenic site near the current position thus positioned in Step S205 (Step S1206). Herein, the CPU 10 does not inquire as to which category the scenic site belongs to, and performs specification of the scenic site by way of extracting scenic sites coming within a range of a 10 km radius from the current position from the scenic site data table, for example.

Then, continuing to the processing of Step S208, the CPU 10 determines in Step S1208 whether or not the scenic site specified in Step S1206 is a site belonging to the category user set (Step S1208). In other words, the CPU 10 determines whether or not the scenic site specified belongs to a category set in the scenic site category setting processing. The CPU 10 advances to the processing of Step S209 in a case of having determined to belong to the category user set (Step S1208: Y); whereas, the CPU 10 advances to the processing of Step S214 in a case of not having determined to belong to the category user set (Step S1208: N).

Figure 9:
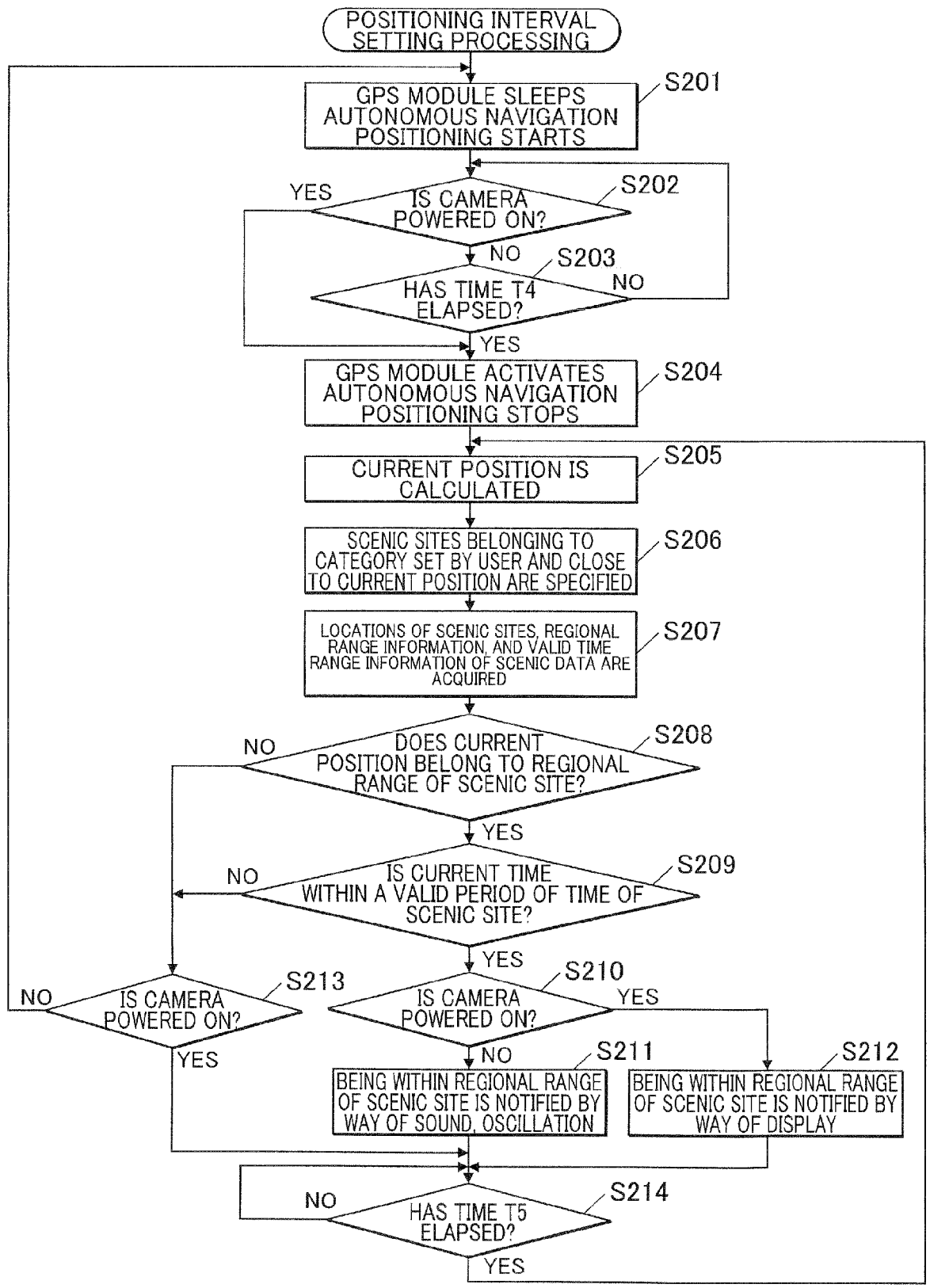
FIG. 9 is a flowchart showing a processing sequence of positioning interval setting processing according to a second embodiment.

In this way, similar effects to processing such as that shown in FIG. 9 are obtained, even if executing processing such as that shown in FIG. 13.

Next, any other behavior of scenic site category setting processing of the second embodiment will be explained with reference to FIG. 14. It should be noted that, in FIG. 14, for steps of performing the same processing as the scenic site category setting processing shown in FIG. 11, the step number is the same, and explanations for the processing contents thereof are omitted.

Figure 14:
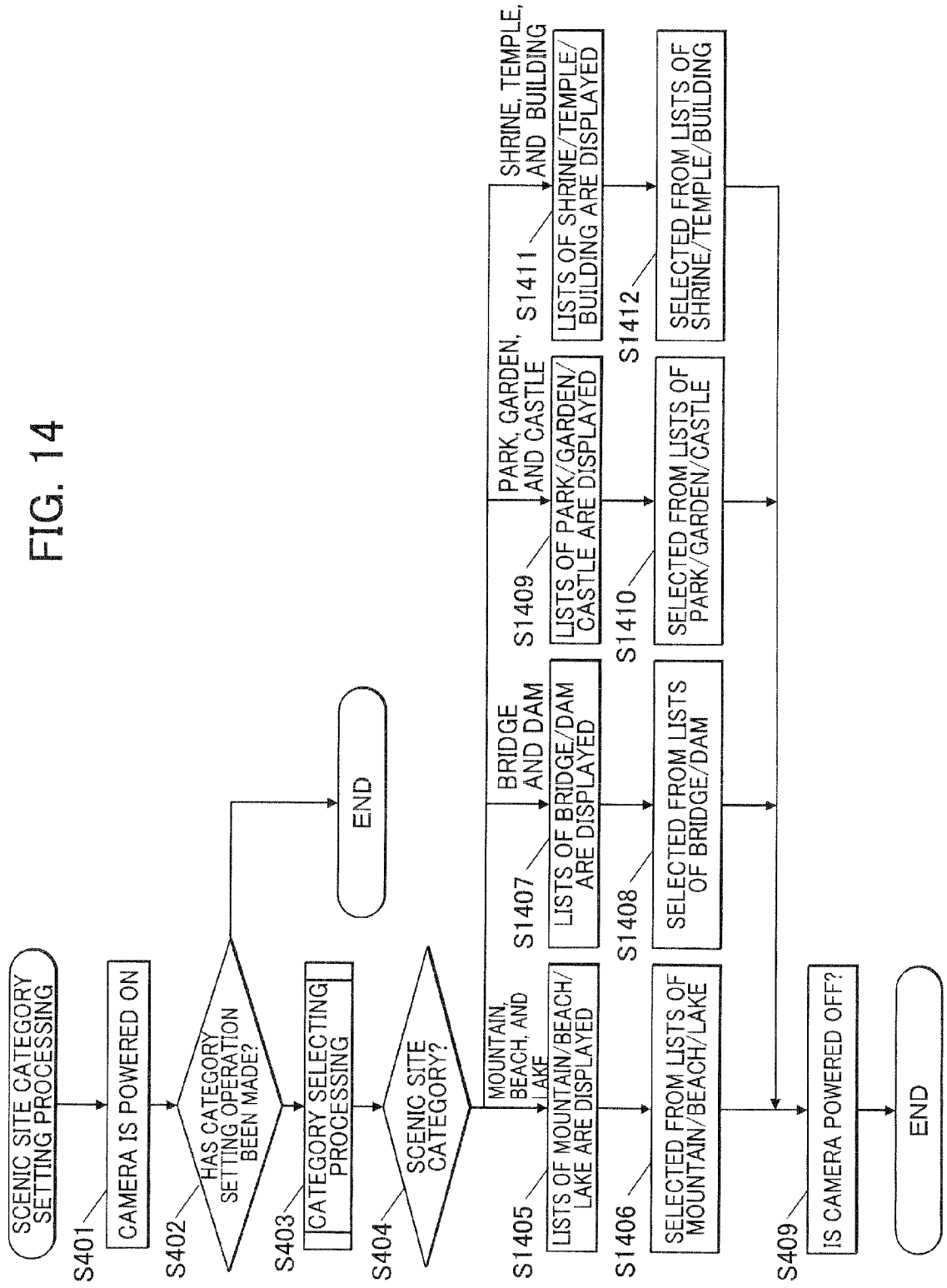
FIG. 14 is a flowchart showing another processing sequence of scenic site category setting processing of the second embodiment.

As shown in FIG. 14, after executing Step S401 to Step S404, if the category selected in Step S403 is the category relating to mountain, beach, and lake, the CPU 10 displays in a list the scenic sites of mountain, beach, and lake stored in the mountain, beach, and lake data table on the display region of the display unit 18 (Step S1405), and if the user operates the operation unit 26 and a portion or all of the scenic sites displayed in a list are selected (Step S1406), the CPU 10 executes the processing of Step S409, and then ends this processing. In addition, if the category selected in Step S403 is the category relating to bridge and dam, the CPU 10 displays in a list the scenic sites of bridge and dam stored in the bridge and dam data table on the display region of the display unit 18 (Step S1407), and if the user operates the operation unit 26 and a portion or all of the scenic sites displayed in a list are selected (Step S1408), the CPU 10 executes the processing of Step S409, and then ends this processing. Moreover, if the category selected in Step S403 is the category relating to park, garden, and castle, the CPU 10 displays in a list the scenic sites of park, garden, and castle stored in the park, garden, and castle data table on the display region of the display unit 18 (Step S1409), and if the user operates the operation unit 26 and a portion or all of the scenic sites displayed in a list are selected (Step S1410), the CPU 10 executes the processing of Step S409, and then ends this processing. Furthermore, if the category selected in Step S403 is the category relating to shrine, temple, and building, the CPU 10 displays in a list the scenic sites of shrine, temple, and building stored in the shrine, temple, and building data table on the display region of the display unit 18 (Step S1411), and if the user operates the operation unit 26 and a portion or all of the scenic sites displayed in a list are selected (Step S1412), the CPU 10 executes the processing of Step S409, and then ends this processing.

In this way, if executing processing such as that shown in FIG. 14, it is possible to cause the positioning interval by GPS positioning to change not only in a case of having come into a scenic site belonging to a favored category of the user, but also in a case having come into the vicinity of a scenic site individually selected by the user.

Third Embodiment

Further, an imaging device 1 according to a third embodiment of the present invention will be explained. It should be noted that the third embodiment is an embodiment in which the positioning interval setting processing of the second embodiment is modified, and for other configurations and processing executed, it is the same as the second embodiment; therefore, for redundant configurations, explanations thereof are omitted.

Figure 15:
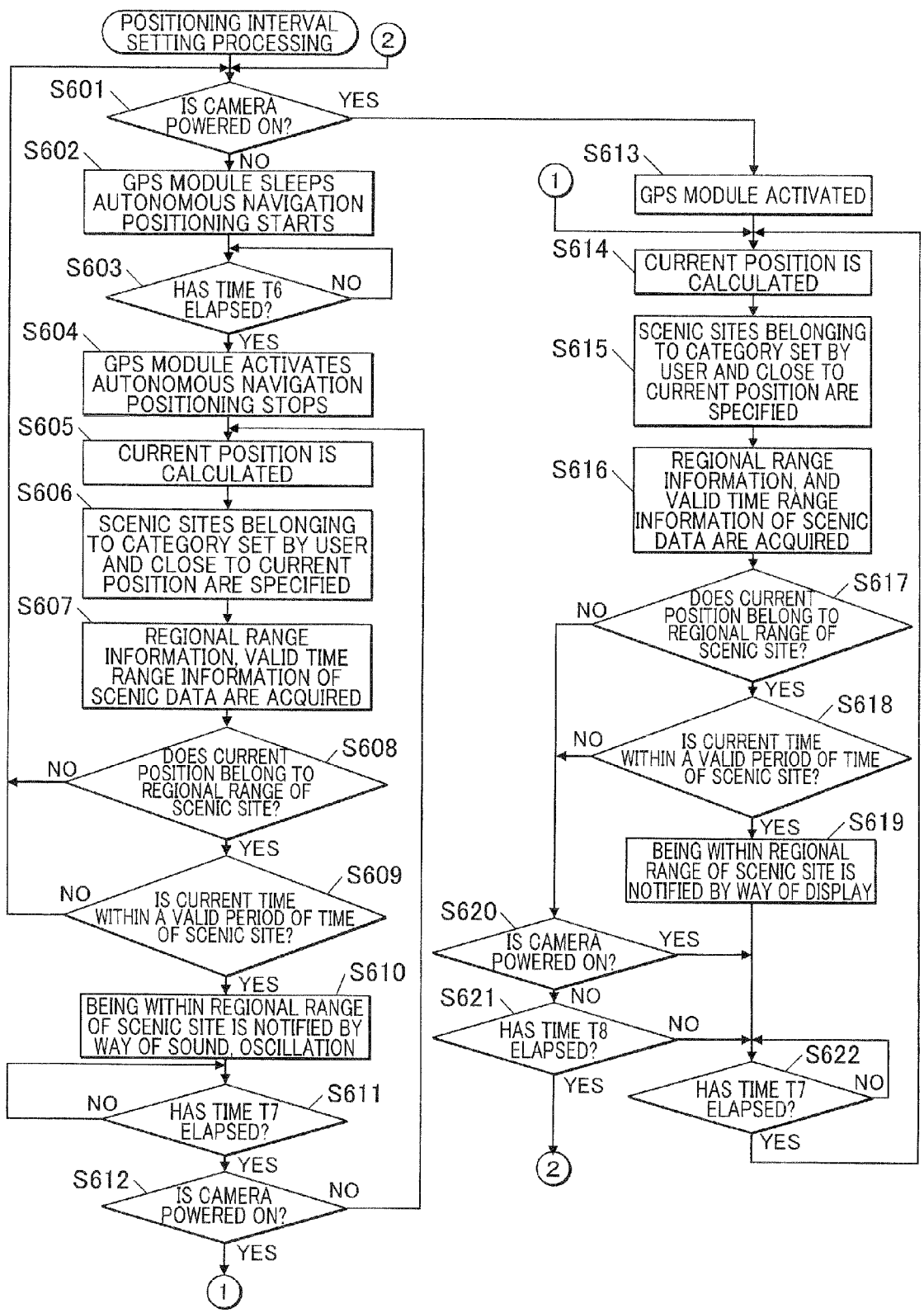
FIG. 15 is a flowchart showing a processing sequence of positioning interval setting processing according to a third embodiment.

The positioning interval setting processing executed in the imaging device 1 according to the third embodiment of the present invention will be explained with reference to FIG. 15.

When the positioning interval setting processing of the third embodiment is initiated, the CPU 10 determines whether or the camera device 23 has been turned ON (Step S601). In a case of not having determined that the electrical power source has been turned ON (Step S601: N), the CPU 10 executes the processing of Step S602), and in a case of having determined that the electrical power source has been turned ON (Step S601: Y), the CPU 10 executes the processing of Step S613.

Next, in Step S602, the CPU 10 causes the GPS module to enter a sleep state, and initiates autonomous navigation positioning (Step S602).

Then, the CPU 10 waits for the elapse of a time T6 since the GPS module entered the sleep state (Step S603), causes the GPS module to activate, and causes the autonomous navigation positioning to stop (Step S604). Although this time T6 is set to 1 minute, for example, it may be any other time.

Then, the CPU 10 performs positioning of the current position by way of GPS positioning, and stores the results thereof in the movement history data storage unit 22 (Step S605).

Then, the CPU 10 refers to the scenic site data table of the map database 24, and specifies scenic sites belonging to the category user set, which are scenic sites near the current position thus positioned in Step S605 (Step S606). It should be noted that the specification method of scenic sites near the current position and setting of the category by the user are the same as the second embodiment.

Then, the CPU 10 acquires regional range information and valid time range information from the scenic site data of the scenic site specified from the scenic site data table stored in the map database 24 in Step S606 (Step S607).

Next, the CPU 10 determines whether or not the current position comes under the regional range of the scenic site, based on the positioning results of Step S605 and the regional range information of the scenic site data acquired in Step S607 (Step S608). The CPU 10 executes the processing of Step S609 in a case of having determined that the current position comes under the regional range of the scenic site (Step S608: Y), and advances to the processing of Step S601 in a case of not having determined that the current position comes under the regional range of the scenic site (Step S608: N).

Next, in Step S609, the CPU 10 extracts current time information from the clock unit 25, compares with the valid time range information of the scenic site data extracted in Step S607, and determines whether the current time is a valid period of time of the scenic site (Step S609). The CPU 10 advances to the processing of Step S610 in a case of having determined that the current time is a valid period of time (Step S609: Y); whereas, the CPU 10 advances to the processing of Step S601 in a case of not having determined that the current time is a valid period of time (Step S609: N).

Then, in Step S610, the CPU 10 drives either one or both of the sound output unit 27 and oscillation generating device 28 to notify the user possessing the imaging device 1 of being within a region of the scenic site (Step S610), then waits for a time T7 to elapse since GPS positioning was performed in Step S605 (Step S611), and advances to the processing of Step S612. Herein, although the time T7 is set to 1 second, for example, it may be set to any other time.

Next, the CPU 10 determines whether the camera device 23 is powered ON (Step S612). The CPU 10 advances to the processing of Step S614 in a case of having determined that the camera device 23 is powered ON (Step S612: Y); whereas, the CPU 10 advances to the processing of Step S605 in a case of not having determined that the camera device 23 is powered ON (Step S612: N).

On the other hand, in Step S613, after having caused the GPS module to activate (Step S613), the CPU 10 measures the current position by way of GPS positioning, and stores the results thereof in the movement history data storage unit 22 (Step S614). It should be noted that, in Step S613, in a case of the GPS module having already been activated, the processing of Step S614 will be executed without the processing to cause the GPS module to activate again being performed.

Next, the CPU 10 refers to the scenic site data table of the map database 24, and specifies scenic sites belonging to a category user set, which are scenic sites near the current position thus positioned in Step S614 (Step S615).

Then, the CPU 10 acquires regional range information and valid time range information from the scenic site data of the scenic site specified from the scenic site data table stored in the map database 24 in Step S615 (Step S616).

Next, the CPU 10 compares the positioning results of Step S614 and the regional range information of the scenic site data acquired in Step S616, and determines whether the current position comes under the regional range of the scenic site (Step S617). The CPU 10 executes the processing of Step S618 in a case of having determined that the current position comes under the regional range of the scenic site (Step S617: Y), and advances to the processing of Step S620 in a case of not having determined that the current position comes under the regional range of the scenic site (Step S617: N).

Next, in Step S618, the CPU 10 extracts the current time from the clock unit 25, compares with the valid time range information of the scenic site acquired in Step S616, and determines whether the current time is a valid period of time of the scenic site (Step S618). The CPU 10 advances to the processing of Step S619 in a case of having determined that the current time is a valid period of time (Step S618: Y); whereas, the CPU 10 advances to the processing of Step S620 in a case of not having determined that the current time is a valid period of time (Step S618: N).

Then, in Step S619, the CPU 10 performs display of the fact of being within the region of the scenic site in the display region of the display unit 18 (Step S619).

On the other hand, in Step S620, the CPU 10 determines whether the camera device 23 is powered ON (Step S620). The CPU 10 advances to the processing of Step S622 in a case of having determined that the camera device 23 is powered ON (Step S620: Y); whereas, the CPU 10 advances to the processing of Step S621 in a case of not having determined that the camera device 23 is powered ON (Step S620: N).

Then, in Step S621, the CPU 10 determines whether a time T8 has elapsed since the camera device 23 was turned OFF (Step S621). Although this time T8 is set to 20 seconds, for example, it may be any other time. Then, the CPU 10 advances to the processing of Step S601 in a case of having determined that the time T8 has elapsed (Step S621: Y); whereas, the CPU 10 advances to the processing of Step S622 in a case of not having determined that the time T8 has elapsed (Step S621: N).

Then, in Step S622, the CPU 10 waits for the time T7 to elapse since GPS positioning was performed in Step S614 (Step S622), and advances to the processing of Step S612.

In this way, similar effects to the second embodiment are exerted also by the third embodiment. It should be noted that in the positioning interval setting processing of the third embodiment, the CPU 10 may, in a case of specifying the scenic site similarly to any other behavior of the positioning interval setting processing according to the second embodiment, initially, specify scenic sites near the current position irrespective of the category. The CPU may, then, determine whether or not the scenic site thus specified belongs to the category user set, when having come into the regional range corresponding to the scenic site thus specified.

As explained above, according to the embodiments of the present invention, the GPS receiver unit 14 and the CPU 10 perform positioning (GPS positioning) of position information at each time when predetermined positioning conditions are met. Then, the map database 24 stores position information of at least one scenic site in association with any of a plurality of types of categories. Furthermore, the CPU 10 sets one or more scenic sites from among the scenic sites stored in the map database 24. In addition, the CPU 10 sets a region of a size corresponding to the category to which the scenic site thus set belongs, in association with the scenic site. Moreover, the CPU 10 determines whether or not the position information obtained by way of GPS positioning comes under the region thus set. Then, the CPU 10 changes the positioning conditions of GPS positioning based on this determination result. As a result, by causing the region for causing the positioning conditions to change such as changing the positioning interval of GPS positioning to vary in accordance with the purpose of photographing, i.e., use, changing depending on the category of the scenic site, an improvement in the positional accuracy in accordance with a change in the purpose of photographing, i.e., use, becomes possible, and convenience to the user can be improved. Further, being able to cause positioning to be performed by the positioning unit such as the GPS module only as needed; therefore, it is possible to suppress the consumption of electrical power by positioning.

In addition, according to the embodiments of the present invention, the clock unit 25 specifies the current time. Moreover, the CPU 10 further determines whether or not the current time specified by the clock unit 25 is a valid time corresponding to the scenic site thus set. Then, under the condition of having determined that the current time is a valid time, the CPU 10 determines to come under the region thus set. As a result thereof, it is possible to change the positioning conditions depending on whether or not the current time is a period of time necessary for the purpose of photographing, i.e., use, and an improvement in the positional accuracy based on the period of time (e.g., time of day) as well as suppressing of electrical power consumption are achieved.

In addition, according to the embodiments of the present invention, the camera device 23 photographs a subject and acquires captured image information. Furthermore, the GPS receiver unit 14 and the CPU 10 perform positioning (GPS positioning) of position information at each time when predetermined positioning conditions are met. Moreover, the map database 24 stores position information of at least one scenic site in association with any of the plurality of types of categories. Furthermore, the CPU 10 determines which among the plurality of types of categories the position information obtained by GPS positioning in the time period related to photography by the camera device 23 belongs to. Additionally, the CPU 10 selects a category based on this determination result. Then, the CPU 10 extracts position information of the scenic sites belonging to the category thus selected from the map database 24. Furthermore, the CPU 10 sets a region of a size corresponding to the category to which the scenic site extracted belongs, in association with the scenic site. In addition, the CPU 10 determines whether or not the position information obtained by GPS positioning belongs to the region thus set. Then, the CPU 10 changes the positioning conditions of GPS positioning based on this determination result. As a result, by causing the region for causing the positioning conditions to change such as changing the positioning interval of GPS positioning to vary in accordance with the category of the scenic site, an improvement in the positional accuracy in accordance with the category of the scenic site becomes possible. Furthermore, convenience to the user can be improved, as well as being able to cause positioning to be performed by the positioning unit such as the GPS module only as needed; therefore, it is possible to suppress the consumption of electrical power by positioning. In addition, since the positioning conditions can be made to change taking into account of the preference of the user, the convenience to the user can be further improved.

In addition, according to the embodiments of the present invention, the camera device 23 photographs a subject and acquires captured image information. Moreover, the GPS receiver unit 14 and the CPU 10 perform positioning (GPS positioning) at each time when predetermined positioning conditions are met. Furthermore, the map database 24 stores position information of at least one scenic site in association with any of a plurality of types of categories. Then, the CPU 10 determines which among the plurality of types of categories the position information obtained by GPS positioning in the time period related to photography by the camera device 23 belongs to. Additionally, the CPU 10 selects a category based on this determination result. Furthermore, the CPU 10 sets a region of a size corresponding to the category to which the scenic site stored in the map database 24 belongs to, in association with the scenic site. In addition, the CPU 10 determines whether or not the position information obtained by GPS positioning belongs to the region thus set. Moreover, in a case of having determined that the position information belongs to the region thus set, the CPU 10 determines whether or not the scenic site corresponding to the region belongs to the category thus selected. Then, the CPU 10 changes the positioning conditions of GPS positioning based on this determination result.

As a result, by causing the region for causing the positioning conditions to change such as changing the positioning interval of GPS positioning to vary in accordance with the category of the scenic site, an improvement in the positional accuracy in accordance with the category of the scenic site becomes possible. Furthermore, convenience to the user can be improved, as well as being able to cause positioning to be performed by the positioning unit such as the GPS module only as needed; therefore, it is possible to suppress the consumption of electrical power by positioning. In addition, since the positioning conditions can be made to change taking into account of the preference of the user, the convenience to the user can be further improved.

Moreover, according to the embodiments of the present invention, the clock unit 25 specifies the current time. Furthermore, the CPU 10 further determines whether the current time specified by the clock unit 25 is a valid time for the scenic site corresponding to the region set. Then, under the condition of having determined to be a valid time, the CPU 10 determines to be coming under the region thus set. As a result thereof, it is possible to change the positioning conditions depending on whether or not the current time is a period of time necessary for the purpose of photographing, i.e., use, and an improvement in the position information according to the period of time as well as suppressing of electrical power consumption are achieved.

In addition, according to the embodiments of the present invention, the CPU 10 collects the results of determining which among the plurality of types of categories the position information obtained by GPS positioning in the time period related to photography by the camera device 23 belongs to. Then, the CPU 10 performs selection of a category based on the collected results. As a result thereof, since it is possible to more accurately reflect the preferences of the user and make the positioning conditions change, the convenience to the user can be further improved.

In addition, according to the embodiments of the present invention, the operation unit 26 allows for input operations by the user. Furthermore, the CPU 10 sets a plurality of categories among the plurality of types of categories as candidates based on the collected results, and performs selection of a category from the plurality of categories having been set as candidates, based on input results from the operation unit 26. As a result thereof, in allowing the preference of the user to be reflected, a personal favorite can be selected by the user, the convenience to the user can be further improved.

In addition, according to the embodiments of the present invention, in a case of not having determined to come under the region set, the CPU 10 obtains position information by way of GPS positioning, and then changes the positioning conditions of GPS positioning by causing the positioning function of obtaining the position information by way of GPS positioning to stop for a suspension time set in advance. As a result thereof, it is possible to achieve suppressing of the electrical power consumption by a simple method.

In addition, according to the embodiments of the present invention, the three-axis geomagnetic sensor 15, three-axis acceleration sensor 16, and autonomous navigation control unit 20 perform measurement of relative position change (autonomous navigation positioning). Furthermore, the CPU 10 performs measurement of position information by way of autonomous navigation positioning during suspension of the positioning function of obtaining position information by GPS positioning. As a result thereof, intervals in which GPS positioning is not performed can be supplemented by autonomous navigation positioning.

In addition, according to the embodiments of the present invention, the sound output unit 27, oscillation generating device 28 and display unit 18 perform notification in a predetermined manner. Furthermore, since the CPU 10 performs notification by way of the sound output unit 27, oscillation generating device 28 or display unit 18 in a case of having determined to have come into the region set, the fact of being in the vicinity of a scenic site can be made to be recognized by the user.

It should be noted that, although it has been described in the embodiment of the present invention that a positioning device according to the embodiment of the present invention is provided to an imaging device, the positioning device according to the embodiments of the present invention may be applied to a general navigation device of portable type or a mounted positioning device in a moving body.

In addition, although it has been described in the embodiment of the present invention that the current time is extracted from the clock unit 25, is compared with the valid time range information of the scenic site data, and it is determined whether or not the current time is a valid period of time for the scenic site, such a function may not be provided.

In addition, although it has been described in the embodiments of the present invention that the positioning results by GPS positioning acquired immediately before photographing is recorded as a photographing position when the photographing is performed by the camera device 23, GPS positioning may be performed at the time of photographing, and the positioning results acquired at this time may be set as the photographing position. In addition, the positioning results acquired immediately after photographing may be used.

In addition, although it has been described in the embodiments of the present invention that it is determined the region of which scenic site the position at which photographing is performed comes under, and the results thereof are collected in each category and set as judgment factors for selecting a category, such collection may not be performed, and in a case of photographing having been performed in a region of a scenic site even just once, the category to which this scenic site belongs may be selected as a category of user setting.

In addition, although it has been described in the embodiments of the present invention that the number of categories user set is defined as 1, it may be plural number.

In addition, although it has been described in the embodiments of the present invention that it is determined to which region of a scenic site the position at which photographing is performed belongs, and the result thereof is collected in each category and selection is allowed to the user from the plurality of categories, such a configuration may not be provided.

In addition, although it has been described in the embodiments of the present invention that the interval of GPS positioning is changed by making the GPS module enter a sleep state, the timing of acquiring positional data may be changed without making the GPS module enter a sleep state.

Furthermore, although it has been described in the embodiments of the present invention that, in addition to GPS positioning, autonomous navigation positioning is performed by employing a three-axis geomagnetic sensor, three-axis acceleration sensor, autonomous navigation control processing unit, and the like, such elements may not be included and it may be constructed so as to only perform GPS positioning.

In addition, the positioning device according to the present invention may calculate positional data of a photographing position by autonomous navigation positioning based on positional data obtained by GPS positioning acquired before and after photographing, in a case of GPS positioning not being possible due to suitable transmitted data from GPS satellites not being obtained at the time of photographing by the camera device, for example.

In addition, although it has been described in the embodiments of the present invention that notification of the fact of having come into a region corresponding to a scenic site is performed by sound, oscillation, and display, the behavior of notification is not limited thereto, and may be any other means. As the other means, a light emitting device such as LED (Light Emitting Diode), for example, may be exemplified.

In addition, although it has been described in the embodiments of the present invention that the positioning device changes the positioning conditions of GPS positioning when having come into a region corresponding to a scenic site, the positioning device may allow the user to select whether or not to change the positioning conditions before changing the positioning conditions of GPS positioning.

In addition, the positioning device according to the present invention may have a function of specifying a category of user preference from the history of scenic sites photographed in the past when activating the camera device, and, if there is a scenic site belonging to this category in the vicinity of the current position, performing navigation of a route by voice or map display with this scenic site as the destination. Furthermore, in addition to voice and display, the means of navigation may have guidance direction recognized by the user by shifting the center of gravity of the camera device in the guidance direction. Furthermore, the positioning device according to the present invention may allow the user to select whether not to perform navigation before the initiation of navigation.

In addition, the positioning device according to the present invention may have a recommended photographing spot of a scenic site stored in the scenic site database, and navigate a route to the recommended photographing spot when having come into the region corresponding to the scenic site.

Moreover, when photographing is not performed despite having come into the region corresponding to a scenic site, the positioning device according to the present invention may not change the positioning conditions of GPS positioning and only store history thereof despite having come into a region corresponding to the scenic site included in the category to which the scenic site belongs.

In addition, the positioning device according to the present invention may store positional data of a location where the user has performed photographing in the past, irrespective of whether or not the location is a scenic site, and change the positioning conditions of GPS positioning also when having come into a predetermined radial region from the positional data.

Moreover, although it has been described in the embodiments of the present invention that the scenic site data tables are classified into each type of scenic site, the tables may be further subdivided, and may be tabulated according to compass bearing, period of time, etc., at which to perform photography.

Furthermore, the positioning device according to the present may include a voice recognition device and a voice input device, so as to analyze the voice of the user, and enable setting of the category based on the analysis results thereof.

Additionally, although it has been described in the embodiments of the present invention that computing of autonomous navigation positioning and correction processing of positional data are executed by the autonomous navigation control processing unit 20 and the autonomous navigation data correction processing unit 21, these operations may be carried out by way of software processing of the CPU 10.

In addition, although it has been described in the embodiments of the present invention that positioning is performed employing GPS as a positioning unit, various alternative constitutions may be adopted such as performing positioning by communication with base stations for cellular telephones, defining a current position by inputting positional information received from an outside entity using RFID (Radio Frequency Identification), or the like.

Moreover, although it has been described in the embodiments of the present invention that a three-axis geomagnetic sensor and three-axis acceleration sensor are exemplified as a movement measurement unit that performs measurement of relative position variation, a two-axis direction sensor or a two-axis acceleration sensor may be used so long as the orientation of the device to the earth is fixed. Additionally, a gyroscope or the like may also be adopted in order to obtain direction. Furthermore, the rate of movement may be obtained using a wheel speed sensor. In addition, although it has been described in the embodiments of the present invention that the position data obtained is defined as two-dimensional position data, the position data may contain position data of the height direction.

What is claimed is:

1. A positioning device comprising:
    a positioning unit that performs positioning of position information each time a predetermined positioning condition is met;
    a storage unit that stores (i) position information of at least one specified position, in association with a category to which the at least one specified position belongs from among a plurality of types of categories, and (ii) a valid time and a region range of the at least one specified position, the valid time and the region range being stored in association with the category to which the at least one specified position belongs;
    a position setting unit that sets a specified position from among the at least one specified position stored in the storage unit;
    a region setting unit that sets the region range corresponding to the category to which the specified position set by the position setting unit belongs, in association with the specified position;
    a time-keeping unit that specifies a current time;
    a region determining unit that (i) determines whether or not the current time specified by the time-keeping unit is a valid time for the specified position set by the position setting unit, based on the valid time of the specified position stored in the storage unit, and (ii) determines whether or not position information obtained by the positioning unit belongs to the region range set by the region setting unit; and
    a positioning control unit that changes the positioning condition of the positioning unit based on results of the determinations by the region determining unit.

2. A positioning device as set forth in claim 1, wherein if the position information is not determined to belong to the set region range, after performing positioning of the position information by the positioning unit, the positioning control unit changes the positioning condition of the positioning unit by causing the positioning by the positioning unit to stop for a predetermined suspension time.

3. A positioning device as set forth in claim 2, further comprising a movement measurement unit that performs measurement of relative position change, wherein the positioning control unit performs measurement of positional change by the movement measurement unit while the positioning by the positioning unit is stopped.

4. A positioning device as set forth in claim 1, further comprising a notification unit that performs notification in a predetermined manner, wherein the positioning control unit controls the notification unit to perform a notification if the position information is determined to belong to the set region range.

5. The positioning device as set forth in claim 1, wherein:
    the positioning condition comprises a time interval; and
    the positioning control unit changes the time interval from a first time interval to a second time interval which is shorter than the first interval, when it is determined that the current time is a valid time for the set specified position and that the position information obtained by the positioning unit belongs to the set region range.

6. A positioning device comprising:
    an imaging unit that photographs a subject and acquires photographed image information;
    a positioning unit that performs positioning of position information each time a predetermined positioning condition is met;
    a storage unit that stores (i) position information of at least one specified position in association with a category to which the at least one specified position belongs from among a plurality of types of categories, and (ii) a valid time and a region range of the at least one specified position, the valid time and the region range being stored in association with the category to which the at least one specified position belongs;
    a category determining unit that determines, from among the plurality of types of categories, which category the position information positioned by the positioning unit in a time period related to a time when the imaging unit performs photographing belongs to;
    a region setting unit that selects a category based on a result of the determination by the category determining unit, extracts a specified position belonging to the selected category from the storage unit, and sets a region range corresponding to the category to which the extracted specified position belongs, in association with the specified position;
    a time-keeping unit that specifies a current time;
    a region determining unit that (i) determines whether or not the current time specified by the time-keeping unit is a valid time for the specified position extracted by the region setting unit, based on the valid time of the specified position stored in the storage unit, and (ii) determines whether or not position information obtained by the positioning unit belongs to the region range set by the region setting unit; and a positioning control unit that changes the positioning condition of the positioning unit based on results of the determinations by the region determining unit.

7. A positioning device as set forth in claim 6, wherein the region setting unit collects results of the determination by the category determining unit, selects a category based on the collected results, extracts a specified position belonging to the selected category, and sets the region range corresponding to the category to which the extracted specified position belongs, in association with the specified position.

8. A positioning device as set forth in claim 7, further comprising an input unit that allows an input operation by a user, wherein the positioning control unit sets a plurality of categories from among the plurality of types of categories as candidates based on the collected results, and selects a category from among the set plurality of categories based on an input from the input unit.

9. A positioning device as set forth in claim 6, wherein if the position information is not determined to belong to the set region range, after performing positioning of the position information by the positioning unit, the positioning control unit changes the positioning condition of the positioning unit by causing the positioning by the positioning unit to stop for a predetermined suspension time.

10. A positioning device as set forth in claim 9, further comprising a movement measurement unit that performs measurement of relative position change, wherein the positioning control unit performs measurement of positional change by the movement measurement unit while the positioning by the positioning unit is stopped.

11. A positioning device as set forth in claim 6, further comprising a notification unit that performs notification in a predetermined manner, wherein the positioning control unit controls the notification unit to perform a notification if the position information is determined to belong to the set region range.

12. The positioning device as set forth in claim 6, wherein:
the positioning condition comprises a time interval; and
the positioning control unit changes the time interval from a first time interval to a second time interval which is shorter than the first interval, when it is determined that the current time is a valid time for the extracted specified position and that the position information obtained by the positioning unit belongs to the set region range.

13. A positioning device comprising:
an imaging unit that photographs a subject and acquires photographed image information;
a positioning unit that performs positioning of position information each time a predetermined positioning condition is met;
a storage unit that stores (i) position information of at least one specified position, in association with a category to which the at least one specified position belongs from among a plurality of types of categories, and (ii) a valid time and a region range of the at least one specified position, the valid time and the region range being stored in association with the category to which the at least one specified position belongs;
a category determining unit that determines, from among the plurality of types of categories, which category the position information positioned by the positioning unit in a time period related to a time when the imaging unit performs photographing belongs to;

a region setting unit that sets a region range corresponding to a category to which the specified position stored in the storage unit belongs, in association with the specified position;
a time-keeping unit that specifies a current time;
a region determining unit that (i) determines whether or not the current time specified by the time-keeping unit is a valid time for the specified position, based on the valid time of the specified position stored in the storage unit, and
(ii) determines whether or not position information obtained by the positioning unit belongs to the region range set by the region setting unit; and
a positioning control unit that determines whether or not the category associated with the specified position matches the category determined by the category determining unit if position information obtained by the positioning unit is determined to belong to the region range and if the current time specified by the time-keeping unit is determined to be a valid time for the specified position, and changes the positioning condition of the positioning unit based on a result of the determination.

14. A positioning device as set forth in claim 13, wherein the region setting unit collects results of the determination by the category determining unit, selects a category based on the collected results, extracts a specified position belonging to the selected category, and sets the region range corresponding to the category to which the extracted specified position belongs, in association with the specified position.

15. A positioning device as set forth in claim 14, further comprising an input unit that allows an input operation by a user, wherein the positioning control unit sets a plurality of categories from among the plurality of types of categories as candidates based on the collected results, and selects a category from among the set plurality of categories based on an input from the input unit.

16. A positioning device as set forth in claim 13, wherein if the position information is not determined to belong to the set region range, after performing positioning of the position information by the positioning unit, the positioning control unit changes the positioning condition of the positioning unit by causing the positioning by the positioning unit to stop for a predetermined suspension time.

17. A positioning device as set forth in claim 16, further comprising a movement measurement unit that performs measurement of relative position change, wherein the positioning control unit performs measurement of positional change by the movement measurement unit while the positioning by the positioning unit is stopped.

18. A positioning device as set forth in claim 13, further comprising a notification unit that performs notification in a predetermined manner, wherein the positioning control unit controls the notification unit to perform a notification if the position information is determined to belong to the set region range.

19. The positioning device as set forth in claim 13, wherein:
the positioning condition comprises a time interval; and
the positioning control unit changes the time interval from a first time interval to a second time interval which is shorter than the first interval, when it is determined that the current time is a valid time for the specified position and that the position information obtained by the positioning unit belongs to the region range.

20. A positioning method of changing a positioning condition of a positioning unit that performs positioning of position information each time the positioning condition is met, the method comprising:
- setting a specified position from among one or more specified positions, each specified position being stored in a storage unit that stores (i) position information of the specified position in association with a category to which the specified position belongs from among a plurality of types of categories, and (ii) a valid time and a region range of the specified position, the valid time and the region range being stored in association with the category to which the specified position belongs;
- setting a region range corresponding to the category to which the set specified position belongs, in association with the specified position;
- specifying a current time; and
- determining whether or not the specified current time is a valid time for the set specified position, based on the valid time of the specified position stored in the storage unit, determining whether or not position information obtained by the positioning unit belongs to the set region range, and changing the positioning condition of the positioning unit based on results of the determinations.

21. A positioning method of changing a positioning condition of a positioning unit that is configured to perform positioning of position information each time the positioning condition is met, the positioning unit being configured to perform positioning of positioning information at a location at which an imaging unit photographs a subject and acquires photographed image information, the method comprising:
- determining, from among a plurality of types of categories, which category the position information positioned by the positioning unit in a time period related to a time when the imaging unit performs photographing belongs to;
- selecting a category based on a result of the determining, and extracting a specified position belonging to the selected category from among one or more specified positions each specified position being stored in a storage unit that stores (i) position information of the specified position in association with a category to which the specified position belongs from among the plurality of types of categories, and (ii) a valid time and a region range of the specified position, the valid time and the region range being stored in association with the category to which the specified position belongs;
- setting a region range corresponding to the category to which the extracted specified position belongs, in association with the specified position;
- specifying a current time; and
- determining whether or not the specified current time is a valid time for the extracted specified position, based on the valid time of the specified position stored in the storage unit, determining whether or not position information obtained by the positioning unit belongs to the set region range, and changing the positioning condition of the positioning unit based on results of the determinations.

22. A positioning method of changing a positioning condition of a positioning unit that is configured to perform positioning of position information each time the positioning condition is met, the positioning unit being configured to perform positioning of positioning information at a location at which an imaging unit photographs a subject and acquires photographed image information, the method comprising:
- determining, from among a plurality of types of categories, which category the position information positioned by the positioning unit in a time period related to a time when the imaging unit performs photographing belongs to;
- setting a region range corresponding to a category to which a specified position belongs from among the plurality of types of categories, in association with the specified position, the specified position being stored in a storage unit that stores (i) position information of the specified position in association with the category to which the specified position belongs from among the plurality of types of categories, and (ii) a valid time and a region range of the specified position, the valid time and the region range being stored in association with the category to which the specified position belongs;
- specifying a current time;
- determining whether or not the specified current time is a valid time for the specified position, and determining whether or not the position information obtained by the positioning unit belongs to the set region range; and
- determining whether or not the category associated with the specified position matches the determined category if position information obtained by the positioning unit is determined to belong to the region range and if the current time is determined to be a valid time for the specified position, and changing the positioning condition of the positioning unit based on results of the determination.

23. A non-transitory computer readable storage medium having a program stored thereon which is executable by a computer that accepts a positioning result from a positioning unit that performs positioning of position information each time a predetermined positioning condition is met, and changes the positioning condition of the positioning unit, the program controlling the computer to function as units comprising:
- a position setting unit that sets a specified position from among one or more specified positions, each specified position being stored in a storage unit that stores (i) position information of the specified position in association with a category to which the specified position belongs from among a plurality of types of categories, and (ii) a valid time and a region range of the specified position, the valid time and the region range being stored in association with the category to which the specified position belongs;
- a region setting unit that sets a region range corresponding to the category to which the specified position set by the position setting unit belongs, in association with the specified position;
- a region determining unit that determines whether or not a current time specified by a time-keeping unit is a valid time for the specified position set by the position setting unit, based on the valid time of the specified position stored in the storage unit, and determines whether or not the positioning information obtained by the positioning unit belongs to the region range set by the region setting unit; and
- a positioning control unit that changes the positioning condition of the positioning unit based on results of the determinations by the region determining unit.

24. A non-transitory computer readable storage medium having a program stored thereon which is executable by a computer that accepts a positioning result from a positioning unit that performs positioning of position information each time a predetermined positioning condition is met, and changes the positioning condition of the positioning unit, the program controlling the computer to function as units comprising:

a category determining unit that determines, from among a plurality of types of categories, to which category the position information positioned by the positioning unit in a time period related to a time when the imaging unit performs photographing belongs to;

a region setting unit that selects a category based on a determination result of the category determining unit, extracts a specified position belonging to the selected category from one or more specified positions and sets a region range corresponding to the category to which the extracted specified position belongs, in association with the specified position, wherein each of the one or more specified positions is stored in a storage unit that stores (i) position information of the specified position in association with a category to which the specified position belongs from among the plurality of types of categories, and (ii) a valid time and a region range of the specified position, the valid time and the region range being stored in association with the category to which the specified position belongs;

a region determining unit that determines whether or not a current time specified by a time-keeping unit is a valid time for the extracted specified position, based on the valid time for the specified position stored in the storage unit, and determines whether or not Position information obtained by the positioning unit belongs to the region range set by the region setting unit; and a positioning control unit that changes the positioning condition of the positioning unit based on results of the determinations by the region determining unit.

25. A non-transitory computer readable storage medium having a program stored thereon which is executable by a computer that accepts a positioning result from a positioning unit that performs positioning of position information each time a predetermined positioning condition is met, and changes the positioning condition of the positioning unit, the program controlling the computer to function as units comprising:

a category determining unit that determines, from among a plurality of types of categories, which category the position information positioned by the positioning unit in a time period related to a time when the imaging unit performs photographing belongs to;

a region setting unit that sets a region range corresponding to a category to which a specified position belongs from among the plurality of types of categories, in association with the specified position, the specified position being stored in a storage unit that stores (i) position information of the specified position in association with the category to which the specified position belongs from among the plurality of types of categories, and (ii) a valid time and a region range of the specified position, the valid time and the region range being stored in association with the category to which the specified position belongs;

a region determining unit that determines whether or not a current time specified by a time-keeping unit is a valid time for the specified position, and determines whether or not position information obtained by the positioning unit belongs to the region range set by the region setting unit; and a positioning control unit that determines whether or not the category associated with the specified position matches the category determined by the category determining unit if position information obtained by the positioning unit is determined to belong to the region range and if the current time specified by the time-keeping unit is determined to be a valid time for the specified position, and changes the positioning condition of the positioning unit based on results of the determination.

* * * * *